(12) United States Patent
Wong et al.

(10) Patent No.: US 8,483,873 B2
(45) Date of Patent: Jul. 9, 2013

(54) AUTONOMOUS ROBOTIC LIFE FORM

(75) Inventors: Sui Kay Wong, North Point (HK);
Kwok Yau Cheung, Yuen Long (HK)

(73) Assignee: Innvo Labs Limited, Fanling, New Territories (HK)

(*) Notice: Subject to any disclaimer, the term of this patent is extended or adjusted under 35 U.S.C. 154(b) by 95 days.

(21) Appl. No.: 12/839,569

(22) Filed: Jul. 20, 2010

(65) Prior Publication Data
US 2012/0022688 A1 Jan. 26, 2012

(51) Int. Cl.
*A63H 11/00* (2006.01)
*G06N 3/00* (2006.01)

(52) U.S. Cl.
USPC .......................................................... 700/245

(58) Field of Classification Search
USPC ................................................. 700/245, 253
See application file for complete search history.

(56) References Cited

U.S. PATENT DOCUMENTS

| | | | |
|---|---|---|---|
| 3,911,613 | A | 10/1975 | Morrison et al. |
| 5,845,540 | A | 12/1998 | Rosheim |
| 6,048,209 | A | 4/2000 | Bailey |
| 6,057,859 | A | 5/2000 | Handelman et al. |
| 6,088,042 | A | 7/2000 | Handelman et al. |
| 6,175,772 | B1* | 1/2001 | Kamiya et al. ................. 700/31 |
| 6,374,155 | B1 | 4/2002 | Wallach et al. |
| 6,415,203 | B1* | 7/2002 | Inoue et al. ................... 700/245 |
| 6,446,056 | B1 | 9/2002 | Sadakuni |

(Continued)

FOREIGN PATENT DOCUMENTS

| | | |
|---|---|---|
| EP | 1195231 | 4/2002 |
| EP | 1229471 | 8/2002 |

(Continued)

OTHER PUBLICATIONS

Brown, Jeff, "Pleo evolves on four legs and two ARMs . . . ," Electronic Engineering Times, Jul. 28, 2008, n. 1536, p. 49.*

(Continued)

*Primary Examiner* — James Trammell
*Assistant Examiner* — David Testardi
(74) *Attorney, Agent, or Firm* — Erickson Kernell Derusseau & Kleypas, LLC

(57) ABSTRACT

A robotic life form simulates a live creature responsive to a changing environment sensed by the robot, and has a robotic body that is articulated for motion around an upright axis and supported by at least two legs, each having at least two joints. The neck of the body terminates in a head provided with eyes and a mouth, and, in the illustrated creature, has a tail. Internal and external input sensors are located on the robotic body and responsive to touch, sound and lighting conditions, motion, food, temperature, voice commands, time of day, and obstacles and hazards, and include a head touch sensor, a plurality of touch sensors extending along a torso of the body, and a plurality of touch sensors on the feet. Actuators responsive to the input sensors control the eyes of the robot, opening and closing of its mouth, movement of the head, movement of the neck relative to the torso, and relative movements of the front and rear sections of the torso to cause the torso to pivot and twist and thereby provide lifelike responses to the sensed conditions. Drive index levels in accordance with priority criteria selected from a plurality of animation groups determine the drive index levels, and servo actuators associated with the body are responsive to dominant drive indexes causing the robot to execute animations resulting therefrom.

22 Claims, 21 Drawing Sheets

U.S. PATENT DOCUMENTS

| | | | |
|---|---|---|---|
| 6,449,518 B1* | 9/2002 | Yokoo et al. | 700/86 |
| 6,554,679 B1* | 4/2003 | Shackelford et al. | 446/268 |
| 6,586,859 B2 | 7/2003 | Kornbluh et al. | |
| 6,604,980 B1 | 8/2003 | Jumain et al. | |
| 6,615,109 B1* | 9/2003 | Matsuoka et al. | 700/245 |
| 6,620,024 B2* | 9/2003 | Choi | 446/485 |
| 6,650,965 B2* | 11/2003 | Takagi et al. | 700/245 |
| 6,697,707 B2 | 2/2004 | Peters, II | |
| 6,705,871 B1 | 3/2004 | Bevirt et al. | |
| 6,711,467 B2* | 3/2004 | Inoue et al. | 700/245 |
| 6,741,911 B2 | 5/2004 | Simmons | |
| 6,754,560 B2 | 6/2004 | Fujita et al. | |
| 6,792,406 B1* | 9/2004 | Fujimura et al. | 704/257 |
| 6,865,446 B2* | 3/2005 | Yokono et al. | 700/245 |
| 6,980,889 B2 | 12/2005 | Ito | |
| 7,065,490 B1* | 6/2006 | Asano et al. | 704/275 |
| 7,117,190 B2* | 10/2006 | Sabe et al. | 706/45 |
| 7,181,434 B2 | 2/2007 | Lin et al. | |
| 7,249,951 B2 | 7/2007 | Bevirt et al. | |
| 7,395,606 B2 | 7/2008 | Crampton | |
| 7,430,457 B2 | 9/2008 | Watanabe et al. | |
| 7,442,107 B1* | 10/2008 | Ueda et al. | 446/175 |
| 7,515,990 B2 | 4/2009 | Sato et al. | |
| D614,251 S | 4/2010 | Chung | |
| 7,778,730 B2* | 8/2010 | Lee et al. | 700/245 |
| 7,813,835 B2 | 10/2010 | Fujita et al. | |
| 7,984,013 B2* | 7/2011 | Lee et al. | 706/62 |
| 2002/0050802 A1 | 5/2002 | Inque | |
| 2003/0110540 A1 | 6/2003 | Fukui | |
| 2007/0128979 A1* | 6/2007 | Shackelford et al. | 446/484 |
| 2008/0058988 A1 | 3/2008 | Chung et al. | |
| 2008/0077277 A1* | 3/2008 | Park et al. | 700/245 |
| 2008/0274812 A1* | 11/2008 | Chiu et al. | 463/43 |

FOREIGN PATENT DOCUMENTS

| | | |
|---|---|---|
| JP | 317876 | 11/2000 |
| JP | 191273 | 7/2001 |
| JP | 145476 | 5/2003 |
| JP | 074536 | 3/2005 |

OTHER PUBLICATIONS

JPO machine translation of JP 2001-191273.*

Web page, HowStuffWorksExpress, "What can Pleo do?", retrieved from http://express.howstuffworks.com/exp-pleo1.htm, retrieved on Sep. 15, 2012.*

Ugobe Inc., "PLEO: A Companion Guide", Product # 12006, 535-00094, Copyright 2007 Ugobe Inc, 49 pages.(cited by applicant).*

* cited by examiner

| Born-in Attributes 300 | Gender 302 | Activeness 304 | Temperment 306 | Obedience 308 | Tone 310 | Volume 312 | Intelligence 314 |
|---|---|---|---|---|---|---|---|
| | Male | Agile | Bad | Stubborn | Low | Loud | Slow |
| | Neuter | Normal | Normal | Normal | Normal | Normal | Normal |
| | Female | Quiet | Good | Obedient | High | Quiet | Sharp |

Fig. 7

| | Gender | Physical | Optimism | Intelligence |
|---|---|---|---|---|
| DNA Index | Male | Low | Low | Low |
| | Neuter | Medium | Medium | Medium |
| | Female | High | High | High |

Fig. 7A

Priority set up chart of animations resulted from various drive indexes

| Index level | Mood ~322 | | Physical ~324 | | Feed ~326 | | Health ~328 | | Emotion ~330 | |
|---|---|---|---|---|---|---|---|---|---|---|
| 1 | Very sad | B | Very exhausted/sleepy | B | Very hungry(missed+>3 meals) | A | Very sick/injured | A | Very fear/scared/angry | A |
| 2 | Sad | B | Exhausted/sleepy | B | Hungry(missed 2 meals) | A | Sick/injured | A | Fear/scared/angry | A |
| 3 | Fairly sad | B | fairly exhausted/sleepy | B | fairly hungry(missed 1 meal) | A | fairly sick/injured | A | fairly fear/scared/angry | A |
| 4 | Bored | C | tired | C | want to eat(feed time) | C | Weak and dizzy | B | Calm | D |
| 5 | Normal | D | Normal | D | Full | D | Normal | D | Calm | D |
| 6 | Normal | D | Normal | D | Fairly full | D | Normal | D | Calm | D |
| 7 | Fairly happy | D | fairly energetic | D | very full and burp | B | Fairly healthy | D | Fairly excited | D |
| 8 | Happy | D | energetic | D | overfed and puke | B | Healthy | D | Excited | D |
| 9 | Very happy | D | very energetic | D | overfed and sick | B | Very healthy | D | Very excited | D |

Highest priority---A-B-C-D-lowest priority ~332

5 attributes indexes will lead to 5 animations groups, then the animations groups will be chosen per below selection logic and to be played in random combinations and sequence

Animations groups selection logic ~338

| Combinations | Animation groups selection logic |
|---|---|
| ABCD or ABC or ABD or AB | runs A, B only |
| ACD or AC or AD | runs A only |
| BCD or BC or BD | runs B, C only |
| CD or C | runs C + any D to make up to 3 animation groups |
| All D | runs all D |

Fig. 8

| Example | Mood | | Physical | | Feed | | Health | | Emotion | | Selected animation groups |
|---|---|---|---|---|---|---|---|---|---|---|---|
| a | 1 | B | 2 | B | 4 | C | 7 | D | 9 | D | BBC, very sad, exhausted, want to eat |
| b | 9 | D | 5 | D | 3 | A | 2 | A | 1 | A | AAA, fairly hungry, sick, very fearful |
| c | 5 | D | 5 | D | 5 | D | 5 | D | 5 | D | DDDDD, normal, normal, full, normal calm |
| d | 7 | D | 9 | D | 8 | B | 2 | A | 4 | D | AB, Sick, hungry |
| e | 7 | D | 3 | D | 6 | D | 8 | D | 9 | D | B, fairly exhausted |
| f | 2 | B | 3 | B | 4 | C | 5 | D | 6 | D | BBC, sad, exhausted, want to eat |
| g | 5 | D | 6 | D | 3 | A | 2 | A | 7 | D | AA, fairly hungry, sick |
| h | 5 | D | 2 | B | 6 | D | 3 | A | 2 | A | BAA, exhausted, fairly sick, fearful |
| i | 9 | D | 9 | D | 9 | B | 9 | D | 9 | D | B, overfed, sick |
| j | 9 | D | 9 | D | 5 | D | 9 | D | 9 | D | DDDDD, very happy, very energetic, full, very healthy, very excited |
| k | 1 | B | 1 | B | 1 | A | 1 | A | 1 | A | BBAAA, very sad, very exhausted, very hungry, very sick, very fearful |

Note: number is the index level of each attribute

Fig. 9

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Touch sensor 404 | Pet along its back 406 | | | | + | + | | | + | |
| | Pet head top 408 | | | | + | + | | | + | |
| | Pet side chin 410 | | | | + | + | | | | Follow touch head motion 412 |
| | Pet lower chin 414 | | | | | | | + | | |
| | Pet shoulders 416 | | | + | | | | | | |
| | Hit anywhere 418 | | | | − | | | + | − | |
| | Hold and release 420 | | | | | | | | − | |

Fig. 10A

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| G-sensor 422 | Drop & hit ground with head (MDA) 432 | | -- | -- | -- | -- | | -- | | Injured mode 434 |
| Motion – M 424 | Drop & hit ground with tail (MDA) 436 | | -- | -- | -- | -- | | -- | | Injured mode 434 |
| Direction – D 426 | Drop & hit ground with right body side (MDA) 438 | | -- | -- | -- | -- | | -- | | Injured mode 434 |
| Position – P 428 | Drop & hit ground with left body side (MDA) 440 | | -- | -- | -- | -- | | -- | | Injured mode 434 |
| Acceleration – A 430 | Shake (MDA) 442 | | | | -- | -- | | -- | -- | |
| | Swing (MPD) 444 | | | | + | + | | | | |
| | Throw & catch (MPDA) 446 | | | | + | + | | | | |
| | Hold with head up (MDP) 448 | | | | + | + | | | | |
| | Hold with tail up (P) 450 | | | | -- | -- | | -- | -- | |
| | Stand upright (P) 452 | | | | | | | | | |
| | Lay down sideway (P) 454 | | | | | -- | | | | |
| | Directional hit 456 | | | | | | | | | |

Fig. 10B

| Fig. 10B | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| RFID coil at low jaw front and mouth IR blocked 462 | Healthy food 468 | + | + | | | | | | | |
| | Snack junk food 480 | + | | ‒ | | | | | | |
| | Coco fruit 482 | + | + | | | + | | | | |
| | Hot pepper 484 | (+) | + | | | (+) | | | ‒ | |
| | Herbs/minerals 488 | | | + | | | | | | |
| | Overfeed 490 | | | ‒ | | | | | | |
| | Learning sticks for voice commands 500 | | | | | | | | | Voice command recording procedure 502 |

Fig. 10C

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| RFID coil at low jaw front only (mouth IR not blocked) 460 | Healthy food at feed time or hungry 464 | | | | | | | | | Want to eat mode 466 |
| | Healthy food, not feed time and not hungry 470 | | | | | | | | | Refuse to eat mode 475 |
| | Snack junk food 474 | | | | | | | | | Want to eat mode 466 |
| | Coco fruit 476 | | | | | | | | | Want to eat mode 466 |
| | Hot pepper 478 | | | | | | | | | Want to eat mode 466 |
| | Herbs/minerals 486 | | | | | | | | | Refuse to eat mode 488 |
| | Tug of war 492 | | | | | | | | | Choose to play or not mode 494 |
| | Learning sticks for voice commands 496 | | | | | | | | | Voice command recording mode 498 |

Fig. 10D

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Temperature sensor 125 | Over heat 550 | | -- | -- | | | | | -- | Panting mode 552 |
| | Too cold 554 | | -- | -- | | | | | | Sneeze/shake mode 556 |
| | Normal range 558 | | + | + | | | | | | |

Fig. 10E

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Mic 128 | Sound detected 504 | | | | | | | | | |
| | Voice commands - Hello Pleo 506 | | | | | | | | | Voice command mode 508 |
| | Voice commands - Its name 510 | | | | | | | + | | Response motion mode 512 |
| | Voice commands - Come to 514 | | | | | + | | | | Come to me mode 516 |
| | Voice commands - Go to sleep 518 | | | | | + | | | | Go to sleep mode 520 |
| | Voice commands - Play with me 522 | | | | | + | | | | Play with me mode 524 |
| | Voice commands - Eat now 526 | | | | | + | | | | Eating mode 528 |
| | Voice commands - Stay with me 530 | | | | | + | | | | Stay with me mode 532 |
| | Voice commands - Sing a song 534 | | | | | + | | | | Sing a song mode 536 |
| | Voice commands - Play dance 538 | | | | | + | | | | Play dance mode 540 |

Fig. 10F

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Camera 124 | Light at day time 560 | | | | | + | | | | |
| | Dark at day time 562 | | | | (-) | - | (-) | | | Rest mode 564 |
| | Light at night time 566 | | | | (-) | - | | | (-) | Unease mode 568 |
| | Dark at night time 570 | | | | | + | (-) | | | Sleep 572 |
| | Moving object 574 | | | | | | | | | Head follow mode 576 |

Fig. 10G

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Nose IR 122 | Front obstacle- YES 578 | | | | | | | | | Backward/turn mode 580 |
| | Cliff detection 582 | | | | | | | | | Backward walk mode 584 |

Fig. 10H

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Battery voltage 610 | Normal voltage | | | | | | | | | |
| | Low voltage 612 | | | | | | | | | Shut down mode 614 |

Fig. 10I

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Real time clock 600 | Three years reached (aged) 602 | | | | | | | | | Aged mode 604 |

Fig. 10J

| Input Sensor 400 | Input Mode 402 | Feed 326 | Physical 324 | Health 328 | Mood 322 | Emotion 330 | Active 304 | Obey 308 | Temper 306 | Triggered Mode |
|---|---|---|---|---|---|---|---|---|---|---|
| Wake up | Everytime wakeup 606 | | | + | | | | | | Wakeup 608 |

Fig. 10K

Example of FOOD RFID trigger flow chart for the robotic pet

AUTONOMOUS ROBOTIC LIFE FORM

This invention relates to an autonomous animated life form and, in particular, to a robotic life form/companion having lifelike characteristics and responses.

BACKGROUND OF THE INVENTION

Robotic life forms having lifelike characteristics have been introduced and enjoyed around the world. For example, a baby dinosaur sold under the trademark PLEO is a robotic pet that has experienced significant commercial success and is an interesting and enjoyable companion. However, a truly lovable and interesting pet companion capable of replicating the response of a live creature in the numerous aspects of life-like responses to its environment and its master or mistress may have limited capabilities. If, for example, the robot is limited in its ability to respond to a voice command, a touch sensor or an external condition and produce the desired, life-like response, it is less desirable as a life form or pet. A response should reflect the degree of stimulus, such as petting in contrast to a hit, and respond with a corresponding animation. However, if the database of pre-animated legal motions is limited, the action and character of the robotic device is likewise limited.

SUMMARY OF THE INVENTION

In an embodiment of the present invention the aforementioned problem of limited robotic response is addressed by providing a robotic companion responsive to a number of external inputs initiated by its human owner or from other external stimuli and which, within its internal robotics, has the capability of responding with one of a number of possible operational modes to truly provide a life-like response for the pleasure and enjoyment of its owner.

In another aspect of the invention, the input sensors of the robot are responsive to a number of sensed conditions, including G-forces, motion, the direction of the motion, the position of the robotic body and acceleration.

In another aspect of the invention, external input sensors respond to a feeding stimulus, heat and cold, voice commands, light or dark conditions corresponding to the time of day, the presence of obstacles or cliffs, and other conditions to which a living life form would respond.

Yet another aspect of the present invention is the ability of the robot to recognize the voice of its owner and respond accordingly in a life-like manner.

Other advantages and capabilities of this invention will become apparent from the following description taken in connection with the accompanying drawings, wherein is set forth by way of illustration and example, an embodiment of the present invention.

BRIEF DESCRIPTION OF THE DRAWINGS

FIG. 7 is a chart of born-in attributes and values.

FIG. 7A is a DNA index chart.

FIG. 8 is a priority setup chart of animations resulting from associated drive indexes;

FIG. 9 is an example of selected animation groups, each of which produces a corresponding conduct of the robot;

FIGS. 10 A-K are charts listing external inputs and resulting drive modes;

DETAILED DESCRIPTION

Figure 1:
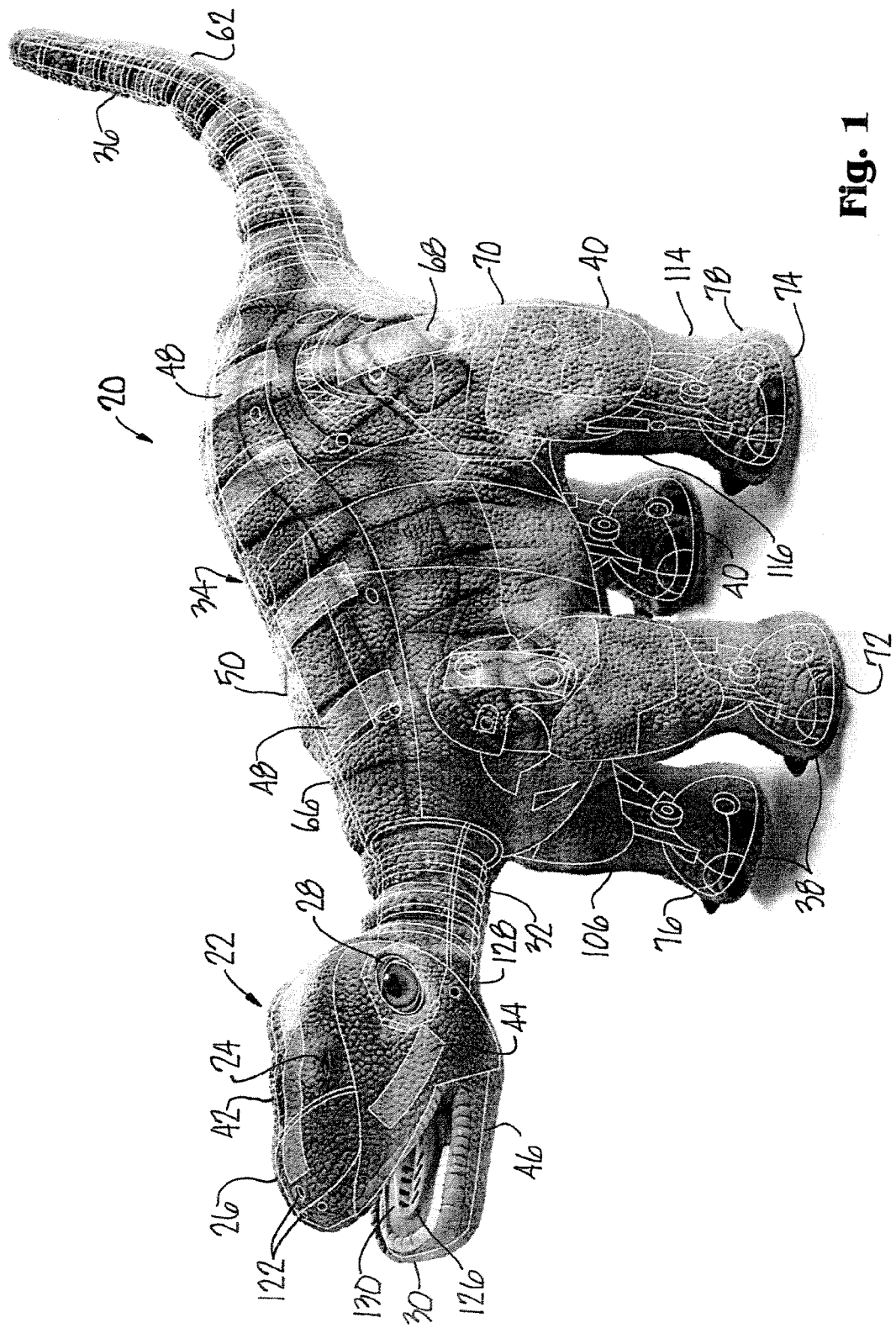
FIG. 1 illustrates an exemplary robotic life form of the present invention, comprising a baby dinosaur and showing the locations of various sensors.
Figure 2:
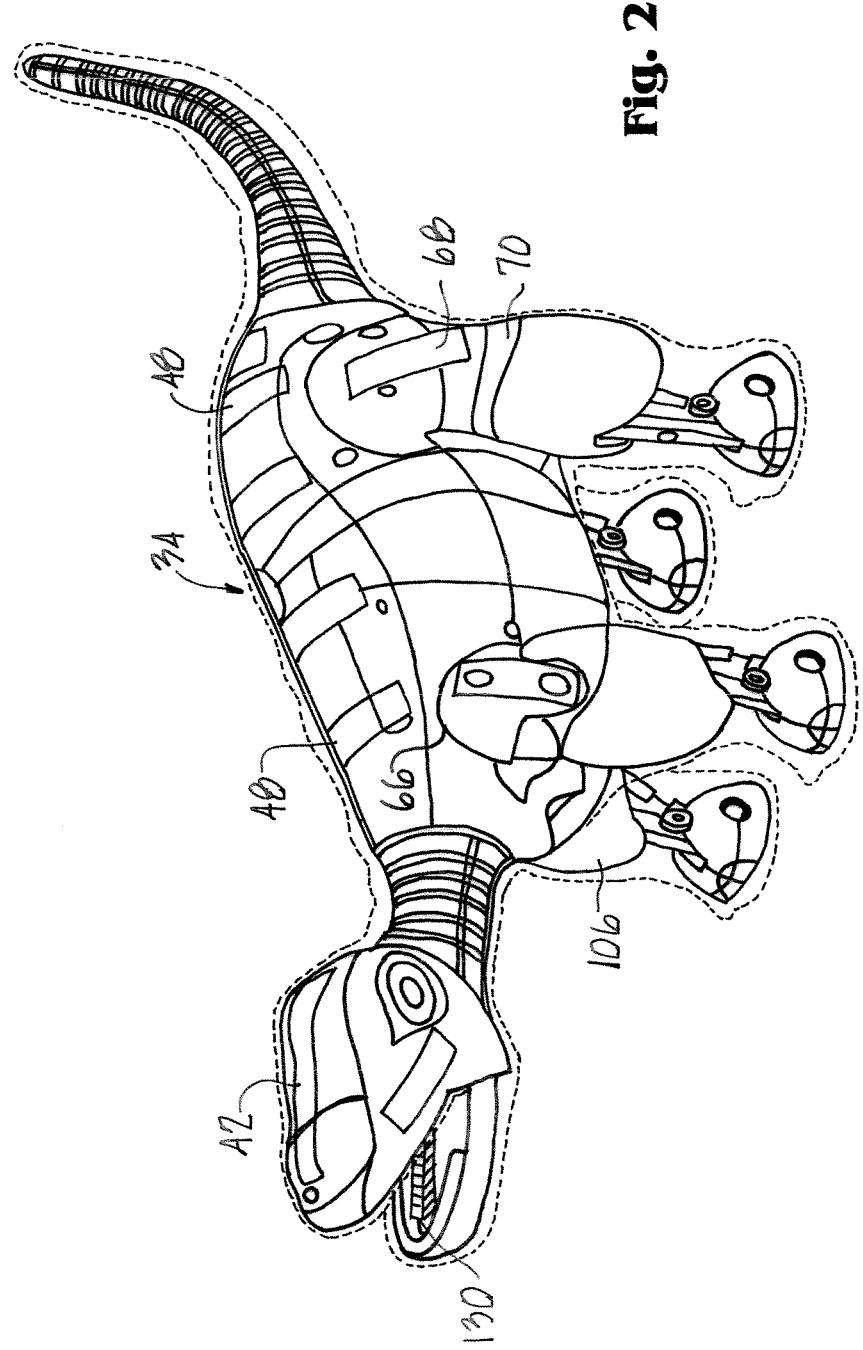
FIG. 2 shows the robotic life form of FIG. 1 with its outer skin removed to reveal interior details.
Figure 3:
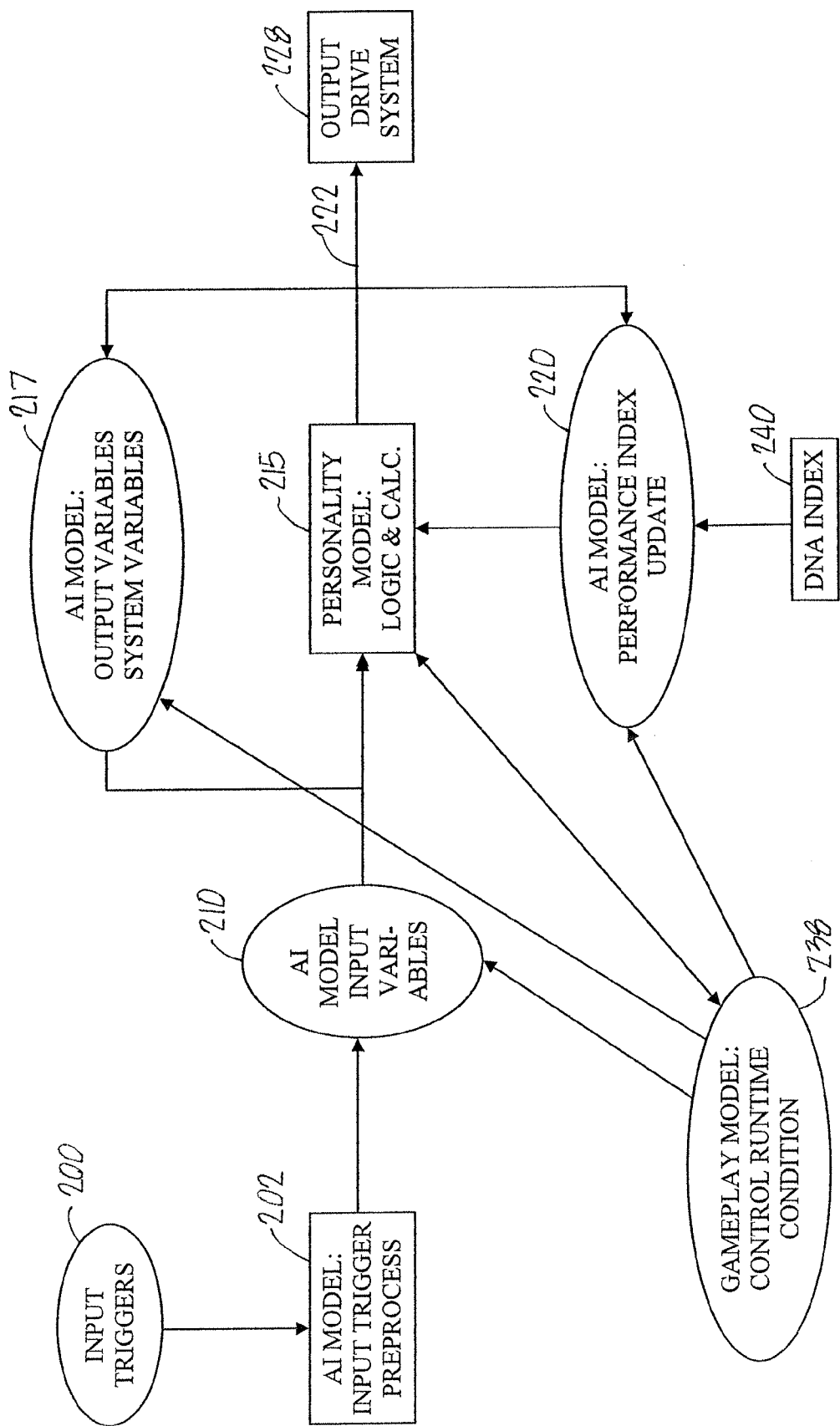
FIG. 3 is a flow diagram showing the artificial intelligence and personality models of the robotic life form of the present invention.

Referring initially to FIG. 1, a robotic life form of the present invention is generally indicated by reference numeral 20. As illustrated, the robotic life form 20 is in the form of a young Camarasaurus dinosaur, a well-known sauropod found in North America and the most abundant of fossils from the late Jurassic period. Its head 22 is short and box-like, with nostrils 24 set above its snout 26 and in front of its eyes 28, and a mouth 30. Its neck 32 is shorter and thicker than most sauropods, and it possesses a thick torso 34 and a short and somewhat flattened tail 36. Its forelimbs or front legs 38 and hindlimbs or back legs 40 are approximately the same length, the hind limbs 40 being slightly longer. In the preferred embodiment the robotic life form 20 is configured as a young Camarasaurus simulating its perceived movements, behavior, personality, interaction with its environment, emotions, reactions and intelligence including learning. However, this invention is not limited to the preferred embodiment set forth herein, as the teachings of this disclosure may be applied to other life forms and robotic life forms. For example, the movements, behavior, personality, environmental interactions, emotions, reactions and intelligence may be applied to a dog specific to its breed beginning as a puppy, and progressing through an adult dog and ending with an old dog, and applied to other common pet forms such as, for example, a cat, turtle, rabbit, horse, pig, cow, etc.

Figure 4:
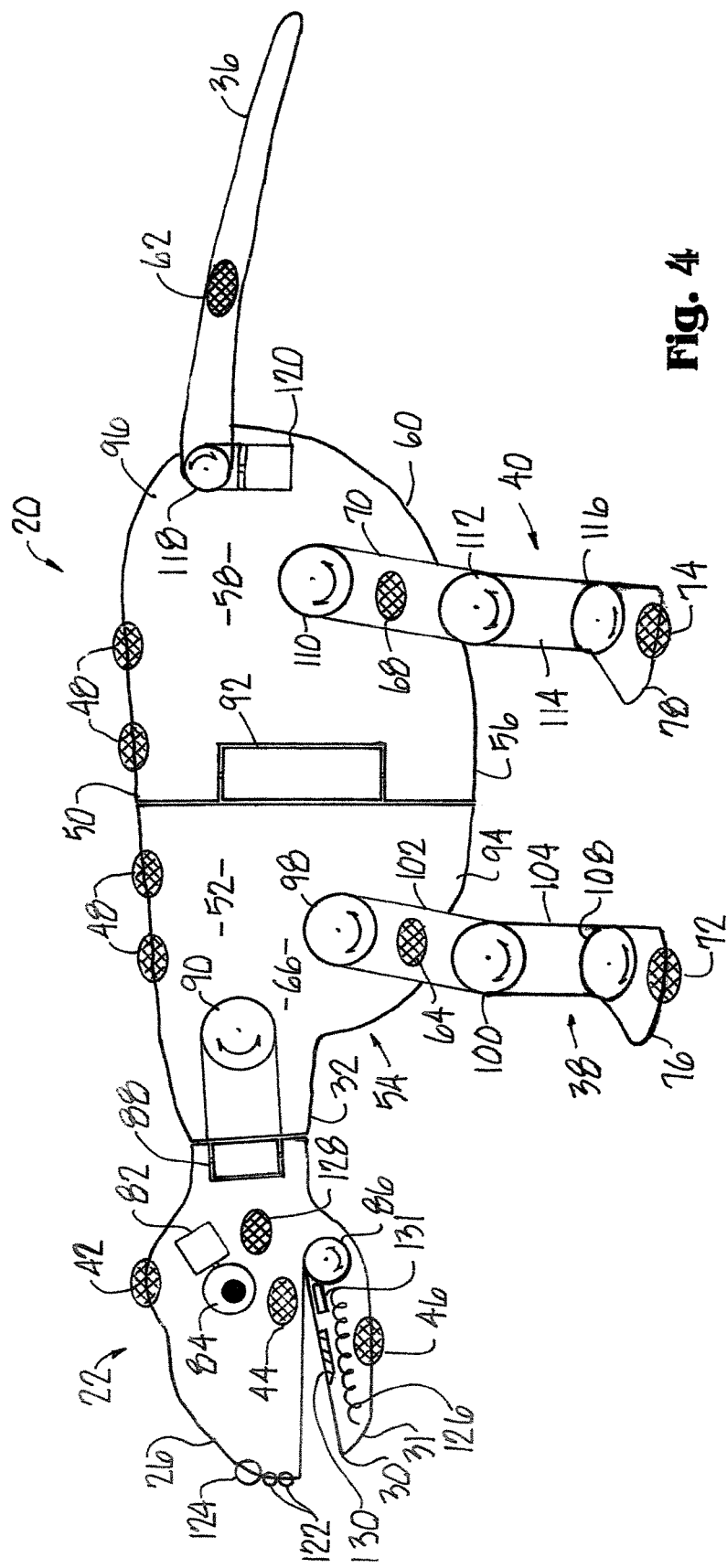
FIG. 4 is a schematic side view of the robotic life form showing actuators and sensors.

Referring to FIGS. 1, 2, 4 and 6, internally the robot includes switching, sensors, electronic controls, servo actuators and motors in addition to software to operate the electronic pet 20. One or more head touch sensors 42 may be located along the top of the head 22. The sensors include touch pads 41 (FIG. 6) coupled to a touch sensor processor 43. Two or more cheek touch sensors 44 may be located on the opposite sides of the head 22. One or more chin touch sensors 46 may be located below the mouth 30 and extend along the front and sides thereof. Along the robot pet's torso 34 one or more touch sensors 48 may be located, four sensors 48 being shown. As illustrated in FIG. 4, the torso touch sensors 48 are only located along the back 50 of the robotic life form 20 so as to not clutter the illustration. However, it should be understood that a plurality of torso touch sensors may be located on the sides 52, chest 54, abdomen 56, hips 58 and bottom 60 of the robotic life form 20 if desired. One or more tail touch sensors 62 may be located along the tail 36. One or more shoulder touch sensors 64 may be located on opposite shoulders 66 of the robotic life form 20. One or more thigh touch sensors 68 may be located on opposite thighs 70 of the robotic life form 20. One or more ground foot touch sensors 72 and 74 may be located in each of the front 76 and back 78 feet, respectively. Alternatively, each foot 76 and 78 may include contact switches.

The touch sensors may be discrete touch sensors or depending on the location, a strip touch sensor. For example, along the top of the head 22 the head touch sensor 42 may be a single discrete touch sensor and the torso touch sensors 48 may be discrete touch sensors or a single strip touch sensor extending from the back of the neck 32 along the back 50 to the tail 36. The discrete or strip touch sensors may be force sensing resistors with a variable sensitivity level using a voltage divider, for example. All of the touch sensors are part of an array of touch sensors covering a part or substantially all of the robot pet's outer skin. An array of touch sensors may be used on the torso 34, for example, while discrete touch sensors are located in specific areas such as the bottoms of the feet 76 and 78. Other touch sensors such as a physical force capacitive touch sensor may also be used. Touch sensors such as thin film flexible tactile force and/or pressure sensors may also be utilized.

Several servo actuators may be embedded in the robotic life form 20. Two or more eye servo actuators 82 (FIG. 4) control movement of the eyes 28 and the eyelids 84. A mouth servo actuator 86 controls opening and closing of the mouth 30. A head servo actuator 88 couples the head 22 to the neck 32 to move the head 22 in a twisting motion. A neck servo actuator 90 couples the neck 32 to the torso 34 to move the neck 32 and head 22 side-to-side, up and down and in a twisting motion. A torso twist servo actuator 92 couples the front torso 94 to the rear torso 96 to pivot and twist the torso 34.

A pair of upper front leg servo actuators 98 couples the front legs 38 to the shoulders 66 for forelimb movement of each leg 38 from the associated shoulder 66 on each side of the robotic life form 20. A pair of middle front leg servo actuators 100 couples the upper portions 102 of the front legs 38 to lower portions 104 of the front legs 38 for forelimb movement at front knees or elbows 106. A pair of lower front leg actuators 108 couples the lower portions 104 of the front legs 38 to the front feet 76 to provide a pivoting and/or twisting motion of the feet 76.

A pair of upper back leg servo actuators 110 couples the back legs 40 to the hips 58 for hind limb movement from the hips 58. A pair of middle back leg servo actuators 112 couples the thighs 70 to lower portions 114 of the back legs 40 for hind limb movement at rear knees. A pair of lower back leg actuators 116 couples the lower portions 114 of the back legs 40 to the feet 78 to provide a pivoting and/or twisting motion of the feet 78.

A tail up-down servo actuator 118 and a tail side-to-side servo actuator 120 couple the tail 36 to the rear torso 96 for tail movement. Control of a servo actuator may be unitary or in any combination to effect a movement. For example, the head servo actuator 88 may move the head 22 side-to-side as in shaking the head 22 "no" or up and down as in shaking the head 22 "yes". The head servo actuator 88 may move the head 22 both side-to-side and up and down to make a circular motion of the head.

Figure 6:
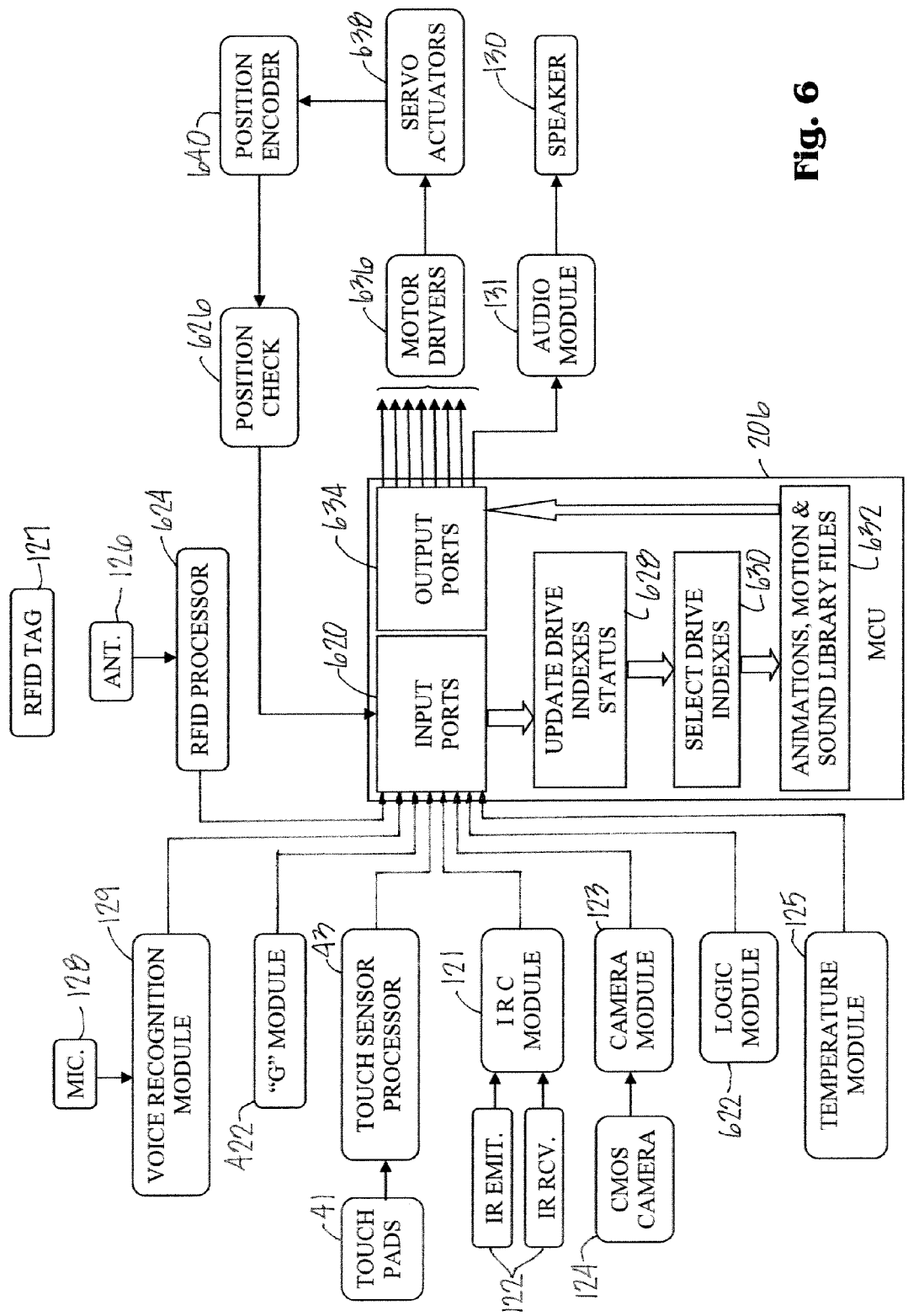
FIG. 6 is a hardware block diagram of the robotic life form.

One or more infrared transmitters/receivers 122 may be embedded in the snout 26 to sense the presence of other robotic life forms and/or receive other information. The transmitters/receivers 122 are connected to an IR module 121 (FIG. 6). The IR transmitters/receivers 122 may be used to sense objects and edges for navigation and to prevent the robotic life form 20 from falling off a table surface or other raised structure, for example.

A CMOS camera 124, coupled to a camera module 123 may be embedded in the snout 26 near the IR transmitter 122 (FIGS. 4 and 6) to detect lighting conditions such as day and night. A temperature sensor 125 provides ambient temperature inputs which may affect the various modes of operation and behavior of the robotic life form 20.

A radio frequency identification (RFID) reader 126 may be integrated in the robotic life form's mouth 30 to respond to RFID tags 127 identified as food, identification cards, and/or learning aids. Although the range of the RFID 126 may be up to forty feet, the range of the particular RFID 126 integrated into the robotic life form's mouth 30 may be limited to requiring the object to be in contact with or very near the robotic life form's chin 31 to a few inches or feet away from the RFID 126.

A pair of microphones located at 128 on each side of the head 22 allows the robotic life form 20 to "hear" commands, determine the direction of a sound, and to recognize and learn a voice. A front speaker 130 coupled to a audio module 131 (FIG. 6) may be located in the mouth 30.

Referring to FIGS. 1-6, all of the sensors provide input triggers 200 to the artificial intelligence (AI) software module 202 (FIG. 3) which is executed by a microprocessor control unit (MCU) 206 (FIG. 6). The input triggers are preprocessed at 208 (FIG. 5) where the input signals are translated and scaled for the AI module 210.

Figure 5:
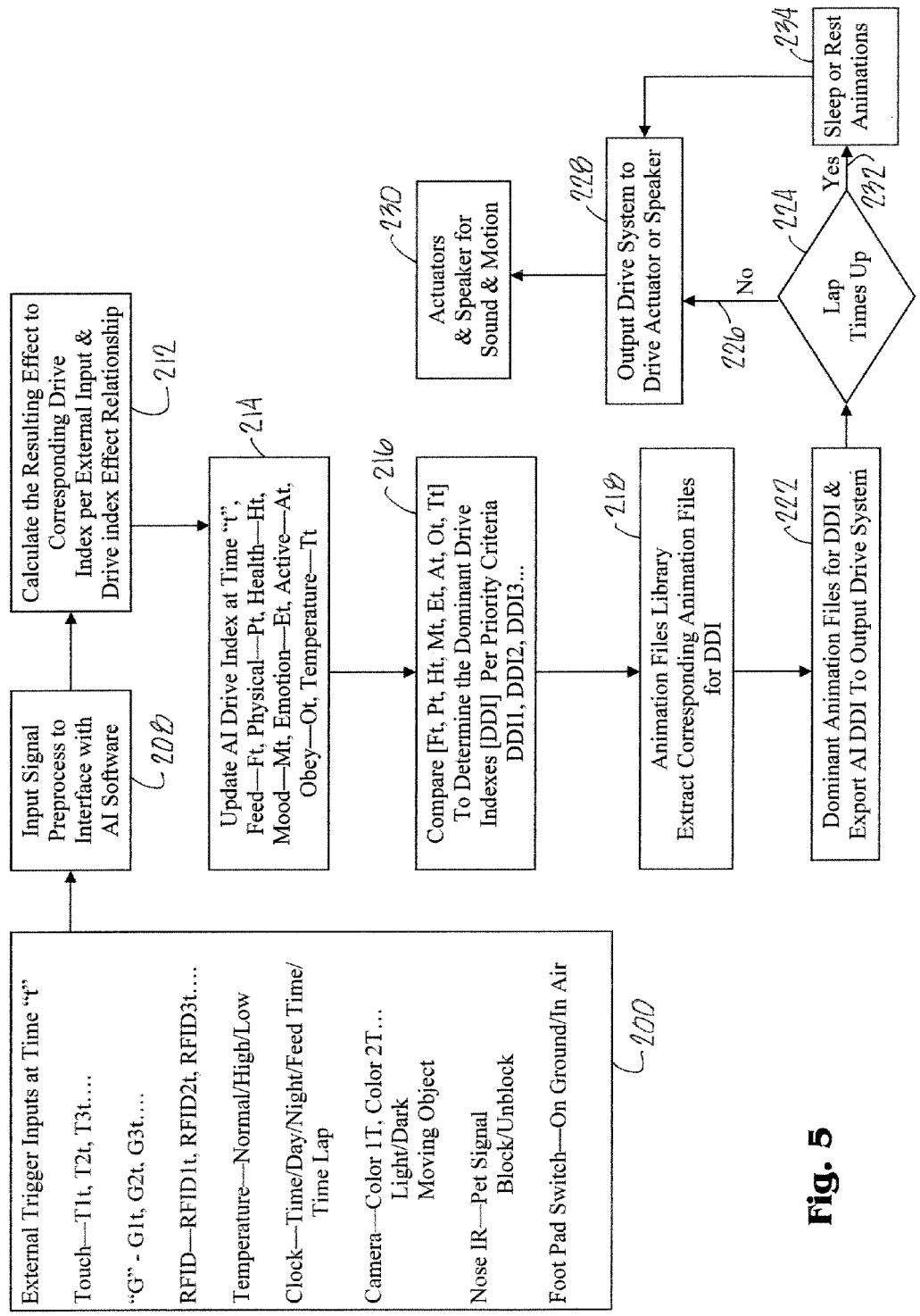
FIG. 5 is a flow chart showing the internal software responsive to external trigger inputs.

The time resulted effect of each of the input values may be scaled according to input and drive index relationship 212. The AI drive indexes at time t are updated at 214. The indexes at time t are compared to determine the dominant drive indexes (DDI) pursuant to priority criteria from output variables 218 and performance indexes 220. Next the dominant animation files for $DDI_{1-N}$ are exported to the drive system 222 (FIG. 5). If the time lap, which is the time interval between external triggers 224 has not expired 226, the output drive system 228 outputs the appropriate signals to the motor drives, actuators and speakers 230. If the time lap is expired 232, a sleep or rest animation 234 is output to the output drive system 228.

The personality model 215 manages all input trigger events 210 (FIG. 3) with the combination of all related conditions, performance index 220, output variables 217 and random variables. The performance index system 220 manages the performance index maintenance from output variables 217, events 238 and the DNA index 240. The output variables 217 are affected by the performance index 220, event trigger 238 and the personality model 215.

Referring to FIG. 7, the robotic life form 20 includes born-in attributes 300 such as gender 302, activeness 304, temperament 306, obedience 308, tone 310, volume 312 and intelligence 314, for example. Gender 302 may be male, female or neuter. The activeness attribute 304 ranges from agile to normal to quiet. The temperament attribute 306 ranges from bad to normal to good. The obedience attribute 308 ranges from stubborn to normal to obedient. The tone attribute 310 ranges from low to normal to high. The volume attribute 312 ranges from quiet to normal to loud. The intelligence attribute 314 ranges from slow to normal to sharp.

Each of these born-in attributes 300 may be affected by one or more of the other born-in attributes. For example, if the gender attribute 302 is "male," the average typical corresponding born-in attributes 300 may include an activeness attribute 304 of "agile," a temperament attribute 306 of "bad," an obedience attribute 308 of "stubborn," a tone attribute 310 of "low," a volume attribute 312 of "loud," and an intelligence attribute 314 of "slow." If the gender attribute 302 is "female," the typical corresponding born-in attributes 300 may be an activeness attribute 304 of "quiet," a temperament attribute 306 of "good," an obedience attribute 308 of "obedient," a tone attribute 310 of "high," a volume attribute 312 of "quiet," and an intelligence attribute 314 of "sharp."

Although each of the born-in attributes are described above as having a range of three values, it should be understood that the range may be discrete volumes and increments or may be continuous. A DNA index is set forth in FIG. 7A.

The born-in values 300 initially set for a particular robotic life form 20 may be based on a bell curve adjusted according to the gender attribute 302. For example, if the gender attribute 302 is neuter, then the center of the bell curves may initially be set to the middle or normal value for each born-in attribute 300. Certain or all born-in attributes 300 may be randomly adjusted and set to limit the predictability of the behavior of the robotic life form 20. If the gender attribute 302 is set to female, then the center of the bell curves may initially be set to a value between the normal value and the outer limit for a female-type attribute. For example, the median value for the activeness attribute 304 for a female may be between normal and quiet. The median value for the tone attribute 310 may be between normal and high. By applying a randomly generated adjustment to each of the born-in attribute 300 values, each robotic life form 20 begins with its own set of attributes that makes it different from other robotic life forms. For example, one female robotic life form may have all of its born-in attribute 300 values within one standard deviation of the median value, while another female robotic life form may have a tone attribute 310 value set to a value on the low side of the scale, two or more standard deviations from the median value for all female robotic life forms.

Referring to FIGS. 7-9, the robotic life form 20 may include five after-born attributes 320, including mood 322, physical 324, feed 326, health 328 and emotion 330. These after born attributes 320, also referred to as drive indexes, are included in the AI system to determine the robotic life form's physical and social behavior. These after-born attributes 320 may be influenced by the born-in attributes 300 and through interaction with its environment.

The mood attribute 322 varies from very sad to normal to very happy. Like real pets, the mood attribute 322 may be negatively affected over time if it is ignored, hit or abused. The mood attribute 322 may be positively affected over time if it is played with, petted, or fed food that it likes, for example. The robotic life form 20 may show or demonstrate its mood through body language and sound. The mood attribute 322 may affect the obedience attribute 308 and activeness attribute 304, for example, demonstrated by its willingness to respond to voice commands and play games.

The physical attribute 324 may range from very exhausted/sleepy to normal to very energetic. The physical attribute 324 may vary over time with a higher energy level in the morning after a full night of sleep declining during the day to a feeling of exhaustion at night before bedtime. Other factors that may influence energy level are the time duration for active motion such as playing a game and the time since last meal or missing a meal, for example, which would decrease the physical attribute 324 value. The energy level may increase with sleep, resting, proper feeding and feeding energy foods, for example. The physical condition may be shown or demonstrated by the robotic life form 20 through its body language, such as quick energetic movements versus slow plodding movements, and by its willingness to respond to commands, and other interactions and external stimuli.

The feed attribute 326 may range from very hungry (i.e., missed three or more meals in a row) to full to overfed and sick. The feed attribute 326 changes over time and is affected by the quantity and type of food "consumed" by the robotic life form 20. If one or more meals are missed, the feed attribute 326 may be decreased which may affect the mood attribute 322, physical attribute 324 and health attribute 328. If too much food is given to the robotic life form 20, if it is fed in between normal feeding times, or it is fed unhealthy foods, the feed attribute may increase, affecting the physical attribute 324 and health attribute 328.

The health attribute 328 may range from very sick/injured to normal to very healthy. The healthy attribute 328 may be abruptly changed from healthy to injured if the robotic 20 is dropped from a height, for example. In an injured condition, the robotic life form 20 may be unable to walk, or limp on the injured leg(s). Further, the location of the injury may affect its movement such a foot, knee, shoulder or back injury. A physical injury may affect the robotic life form's willingness to move, play, response to commands, mood attribute 322 and physical attribute 324. The health attribute 328 may be negatively affected by a temperature (too hot or too cold), or if the robotic life form 20 is fed too much food, too much junk food, hot food or by missing a meal. If the health attribute 328 is below normal, other attributes such as physical 324, mood 322, activeness 304 and obedience 308 may be affected. Feeding the robotic life form 20 herbs and petting the robotic life form 20 may raise the health attribute 328 over time. A robotic life form 20 in a normal to very healthy condition will act normally with its behavior determined by other attributes.

The emotion attribute 330 may range very scared/angry to calm to very excited. The emotion attribute 330 may be negatively affected by dropping the robotic life form 20, holding it upside down or by its tail 36, or keeping it in the dark during daylight hours, for example. Its response of fear or anger may be affected by its gender attribute 302, temperament attribute 306, mood attribute 322, and physical attribute 324, for example. While playing with the robotic life form 20 by swinging it, tossing and catching it or by feeding it spicy food, the emotion attribute 330 may be positively affected as demonstrated by its excitement level. The emotion attribute 330 may affect the robotic life form's behavior to a large extent which is demonstrated by its body language and sound output. The emotion attribute 330 may affect to some extent each of the other attributes 300 and 320.

For each born-after attribute 320, an index level 332 (FIG. 8) is paired to a priority 334 for a particular attribute. As illustrated, the index level ranges from 1 to 9 and the priority ranges from A to D with A being the highest priority and D being the lowest priority. Generally, the lower the index 332, the more negative the associated attribute, and the higher the index 332, the more positive the associated attribute. However, the priority 334 associated with a particular attribute 320 may be assigned based on the strength of the attribute level and influence or relationship to other attributes.

At any particular time, the index level 332 is read for each of the born-after attributes 320 and the associated priority for the particular born-after attribute 320 to determine the combination of the animation group 336. For example, if the mood attribute 322 index is 5, and the physical attribute 324 is 4, and the feed attribute 326 index is 3, and the health attribute 328 is 3 and the emotion attribute 330 index is 6, the combination is DCAAD, or rearranged by priority AACDD. In this example, only the animations associated with the feed attribute 326 and health attribute 328 will be selected from the animation group selection logic 338. Based on the selection logic 338, all priority A and B animations are selected and played before priority C and D animations. Once the sequence of animations is selected, they are played in random combinations and sequence.

Figure 11:
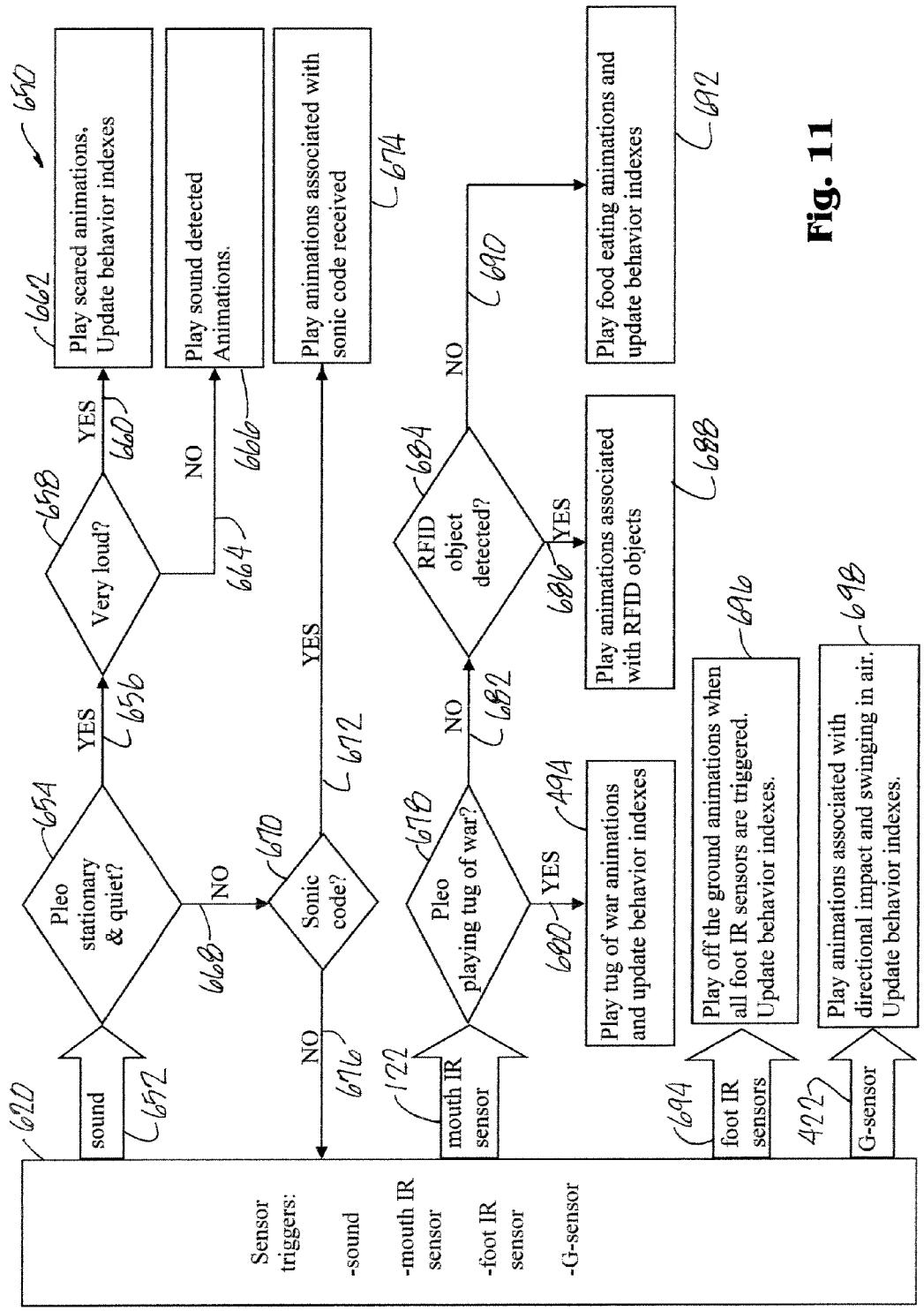
FIG. 11 is a block diagram illustrating the action of four sensor triggers.

As illustrated in FIG. 9, a number of examples 340 are provided along with the selected animation groups 342. In example "344" the mood attribute 322 index is 9, the physical attribute 324 index is 5, the feed attribute 326 index is 3, the health attribute 328 index is 2 and the emotion attribute 330 index is 1. The resulting animation groups selected 342 is AAA corresponding to fairly hungry, sick and very fearful. In example "j" 346, the mood attribute 322 index is 9, the physical attribute 324 index is 9, the feed attribute 326 index is 5, the health attribute 328 index is 9 and the emotion attribute 330 index is 9. The resulting animation groups selected 342 is DDDDD corresponding to very happy, very energetic, full, very healthy, and very excited. Other examples are shown in FIG. 11. It should be understood that the combination of indexes and corresponding animation groups is not limited to the illustrated examples. Depending on the number of indexes, the number of attributes, and the number of priority levels, the combination of animation groups may be virtually unlimited with the added variation of the random order of activation of the particular attribute from the selected animation group.

Referring to FIGS. 5-9 and 10A-10K, the external sensors 400, individually identified in FIG. 4 (e.g. 42, 44, 48 etc.), provide input to and selection of various input modes 402. The input modes 402 affect the various born-in attributes 300 as well as the born-after attributes 320. For example, the touch sensors 404 trigger a number of different input modes depending on the particular touch sensor touched, the sequence of the touch sensor actuation and the force of the touch. If touch sensors 48 are touched in sequence from the neck 32 to the tail 36, the input mode selected is a pet along its back 406. Petting the robotic life form 20 along its back 50 and triggering input mode 406 positively affects the mood attribute 322, emotion attribute 330 and temperament attribute 306. If the mood attribute 322 index was 6, it may be incremented to 7, for example, although not necessarily immediately. The pet along its back input mode 406 may need to be activated for a period of time for one or more of the indexes to be incremental. Additionally, the affected attribute indexes may be incremental at different intervals. For example, the emotion attribute 330 may be incremented more quickly than the mood attribute 322.

If the top of the head 22 is petted by touching sensor 42, a pet head top 408 input mode is selected positively affecting the mood attribute 322, emotion attribute 330 and temperament attribute 306, for example.

If either cheek touch sensor 44 or chin touch sensor 46 is touched a pet side chins 410 input mode is triggered which positively affects the mood attribute 322 and emotion attribute 330, for example. A follow touch head motion mode 412 is triggered which activates the output drive system 228 to activate the head servo actuator 88 and neck servo actuator 90 to move the head 22 toward the side of the head 22 touched.

If the chin touch sensor 46 is touched, a pet lower chin 414 input mode is triggered positively affecting the obedience attribute 308. If the shoulder touch sensor 64 is touched, a pet shoulders 416 input mode is triggered positively affecting the health attribute 328. If the robotic life form 20 is hit anywhere 418, the mood attribute 322 and temper attribute 306 are negatively affected but the obedience attribute 308 is positively affected. Finally, if touch sensors on either side of the robotic life form are touched and held, a hold and release 420 input mode is activated negatively affecting the temperament attribute 306. It should be understood that the various reactions to touch sensor input are for illustrative purposes only and are not limited to the particular reactions shown and described.

Returning to FIG. 10B, a G-sensor 422 (FIG. 6) detects motion (M) 424, direction (D) 426, position (P) 428 and acceleration (A) 430. If the robotic life form 20 is dropped on its head 432, the G-sensor 422 detects motion 424, direction 426 and acceleration 430 as well as the head touch sensor 42 input, negatively affecting the physical 324, health 328, mood 322, emotion 330 and obedience 308 attributes immediately lowering the respective index values. Additionally, an injured mode 434 is triggered.

If the robotic life form 20 is dropped and lands on its tail end 436, the G-sensor 422 detects motion 424, direction 426 and acceleration 430, as well as input from the bottom touch sensor 60 and tail touch sensor 62, negatively affecting the physical 324, health 328, mood 322, emotion 330 and obedience 308 attributes. The associated indexes for these attributes are immediately decremented and the injured mode 434 is triggered.

If the robotic life form 20 is dropped and lands on its right 438 or left side 440, the G-sensor 422 detects motion 424, direction 426 and acceleration 430 as well as input from torso touch sensors located on the sides 52, chest 54, hips 58 and/or legs 38 and 40. The physical 324, health 328, mood 322, emotion 330 and obedience 308 attributes are negatively affected resulting in the associated indexes for these attributes being immediately decremented then triggering the injured mode 434. Depending on which touch sensors are activated one or more legs 38 or 40 may be injured resulting in the robotic life form 20 limping on one or more legs.

If the robotic life form 20 is shaken 442, the G-sensor 422 detects motion 424, direction 426 and acceleration 430 as well as input from the torso touch sensors, negatively affecting the mood 322, emotion 330, obedience 308 and temperament 306 attributes. The amount and rate at which the associated indexes may be decremented may vary depending on how strong and the duration of the shake or shaking, for example.

If the robotic life form 20 is swung 444 from side-to-side or back and forth, the G-sensor 422 detects motion 424, direction 426, position 428 and acceleration 430, as well as detecting input from the torso touch sensors, positively affecting mood 322 and emotion 330 attributes and resulting in the incrementing of the associated indexes immediately or over time.

If the robotic life form 20 is held with its head up 448 the G-sensor 422 detects motion 424, direction 426 and position 428, as well as input from the torso touch sensors, positively affecting mood 322 and emotion 330 attributes. The effect is the incrementing of the associated indexes over time.

If the robotic life form 20 is held by the tail 450, the G-sensor 422 detects position 428 and input is also received from the tail touch sensor 62. The mood 322, emotion 330, obedience 308 and temperament 306 attributes are negatively affected resulting in the decrementing of the associated indexes.

If the robotic life form 20 is standing upright 452 or laying down on a side 454, the G-sensor 422 detects position as well as input from the foot touch sensors 72 and 74 or torso touch sensors. In these positions, there is no negative or positive input on the born-in 300 or after born 320 attributes.

Finally, if the robotic life form 20 is hit 456, touch sensor input may first be received followed by motion 424, direction 426 and/or acceleration 430 being detected by the G-sensor 422. The mood 322 and emotion 330 attributes may be negatively affected resulting in the associated indexes being decremented immediately.

It should be understood that the input modes triggered by the G-sensor 422 and the touch sensors may be varied according to time of day, temperature and other combination of events. For example, if the robotic life form 20 is being thrown and caught 446 but is then dropped, the affected attributes may go from positive to negative triggering the injured mode 434. However, once the robotic life form 20 is injured, the associated attributes may not be positively affected by swinging 444 or throwing and catching 446, for example, much like how an animal or pet would not want to play when it is injured.

Inputs from the IR sensors 122 in combination with the RFID reader 126 trigger input modes related to eating, play and learning, which then affect the born-in 300 and the after born 320 attributes. When the RFID reader 126 detects the presence of an RFID tag 127 and the IR sensors 122 are not blocked 460 (FIG. 10D), the robotic life form 20 may react differently than when the RFID reader 126 detects the presence of an RFID tag and the IR sensors are blocked 462 (FIG. 10C).

For example, if the RFID reader 126 (FIGS. 1, 4 and 6) detects a healthy food RFID tag when it is feed time or the robotic life form is hungry 464 (FIG. 10D), and the IR sensors 122 are not blocked 460, then a want to eat mode 466 is triggered. If a healthy food RFID tag is offered 468 (FIG. 10C) which is detected by the RFID reader 126 and the IR sensors 122 are now blocked 462, the robotic life form 20 will activate the mouth servo actuator 86 to open its mouth 30 and accept the healthy food RFID tag. When the robotic life form 20 "eats" the healthy food 468, the feed 326 and physical 324 attributes are positively affected, incrementing the associated indexes. If a healthy food RFID tag is detected by the RFID reader 126 but if it is not feed time or the robotic life form 20 is not hungry 470, and the IR sensors 122 are not blocked 460, a refuse to eat mode 475 is triggered. If a healthy food RFID tag is offered, which is detected by the RFID reader 126 and the IR sensors 122 are now blocked 462, the robotic life form 20 will activate the neck servo actuator 90 to turn its head 22 away from the food keeping its mouth 30 closed.

If the RFID reader 126 detects a snack junk food RFID tag 474 (FIG. 10D), fruit RFID tag 476, or spicy food such as a hot pepper RFD tag 478 and the IR sensors 122 are not blocked 460, the want to eat mode 466 is triggered. If the IR sensors 122 are blocked and the RFID reader 126 detects a snack junk food 480, a fruit 482 or a spicy food 484 (FIG. 10C), the robotic life form 20 will activate the month servo actuator 86 to open the mouth 30 to accept the food. Any of these foods will increment the feed attribute 326 index. However, junk food 480 will also have a negative affect on the health attribute 328 decrementing the respective index. Fruit 482 and spicy food 484 will have a positive affect on the physical 324 and emotion 330 attributes increasing the associated indexes. But the spicy food 484 may also decrease the temperament attribute 306 index.

If herbs or minerals RFID tags 486 are offered to the robotic life form 20 and the IR sensors are not blocked 460, the refuse to eat mode 488 is triggered (FIG. 10D). If the herbs or minerals 486 are offered and the IR sensors are blocked 462 (FIG. 10C), if the robotic life form 20 is not in an injured mode 434, it will not open its mouth 30 and will turn its head 22 away from the herbs or minerals 486. If it is in an injured mode 434 (FIG. 10B) when offered herbs or minerals 486, it will not turn its head 22 away, but may not immediately open its mouth 30 either. After presenting the herbs or minerals 486 to the robotic life form 20 when it is in an injured mode 434, it may activate the mouth servo actuators 86 to open its mouth 30. When the RFID sensor 126 detects the herbs or minerals 488 RFID tag, the health attribute 328 index may be incremented. If the robotic life form 20 is forced to eat or overfed 490 when it is full or by forcing open its mouth 30 and placing a food RFID tag in its mouth 30 which is detected by the RFID reader 126, the health attribute 328 is negatively affected and the associated index is decremented. If herbs or minerals 488 are force fed to the robotic life form 20, it may act sick afterward to the extent of initiating a vomiting action or response.

If a play toy 492 such as a tug of war is detected by the RFID reader 126 and the IR sensors 122 are not blocked 460, the mouth servo actuator 86 will be activated to open the mouth 30 if the robotic life form 20 wants to play 494 (FIG. 10D). If it does not want to play, the mouth servo actuator 86 will not be activated to open the mouth 30.

If a learning stick RFID tag 496 (FIG. 10D) is detected by the RFID reader 126 and the IR sensors 122 are not blocked 460, a voice command recording mode 498 may be triggered which may be indicated by activation of the tail 36 servo actuators 118 and 120 and head and neck servo actuators 88 and 90 respectively. If the learning stick 496 is detected by the RFID reader 126 when the IR sensor is blocked 462, the mouth servo actuator 86 is activated to open the mouth 30. If the learning stick 500 is placed in the mouth 30 as detected by the RFID reader 126, the mouth 30 is closed by reversing the mouth servo actuator 86 to take the learning stick 500, and the voice command recording procedure 502 is triggered. In the voice command recording procedure 502, the microphone 128 receives commands such as "hello," the robotic life form's name, "come to me," "go to sleep," "play with me," "eat now," "stay with me," "sing a song," and "play dance," for example, which are processed by a voice recognition module 129 (FIG. 6). Other commands may be included or learned by the robotic life form 20. By repeating the command, the robotic life form 20 "learns" the command. If a sound is detected 504 and command received is "hello" 506 (FIG. 10F), the voice command mode 508 is triggered in which the robotic life form 20 listens for other commands. If the robotic life form's name is received 510, the emotion attribute 330 and obedience attribute 308 indexes are incremented, and the response motion mode 512 is triggered. Once the response motion mode 512 is triggered, other commands received are followed. If the response motion mode 512 is not triggered by receiving the pet's name 510 before receiving another of the commands, the response to the command may or may not be followed depending on the born-in attributes 300 and the then current state of the other after-born attributes 320.

If the command "come to me" is received 514 (FIG. 10F), then the emotion attribute 330 index is incremented and a "come to me" mode is triggered. In the "come to me" mode 516, the robotic life form 20, using the stereo microphones 128 on each side of the head 22, moves toward the source of the command and then stops to await another command.

If the command "go to sleep" is received 518, then the emotion attribute 330 index is incremented and a "go to sleep" mode 520 is triggered. In the "go to sleep" mode 520, the robotic life form 20 will go to sleep on command if it is in a tired physical attribute state 324. Otherwise, it may lay down, but may or may not go to sleep.

If the command "play with me" is received 522, then the emotion attribute 330 index is incremented and a "play with me" mode 524 is triggered. In the "play with me" mode 524, the robotic life form 20 may exhibit an interest in playing or becoming more active or excited.

If the command "stay with me" is received 530, then the emotion attribute 330 index is incremented and a "stay with me" mode 532 is triggered. In the "stay with me" mode 532, the robotic life form 20 will follow the source of the command until no sounds are received for a predetermined period of time or until another mode is entered into. If the command "sing a song" is received 534, then the emotion attribute 330 index is incremented and a "sing a song" mode 536 is triggered. In the "sing a song" mode 536, the robotic life form 20 may produce a tune through the speaker 130.

If the command "play dance" is received 538, then the emotion attribute 330 index is incremented and a "play dance" mode 540 is triggered. In the play dance mode 540, the robotic life form 20 may dance to the rhythm of music that it receives through the microphones 128.

All of the voice commands and response thereto are interrelated to the state of the born-in attributes 300 and after-born attributes 320 as well as other modes. For example, if a voice command has not yet been learned by first triggering the voice command recording procedure 502, then the mode associated with that command cannot be triggered because the robotic life form 20 does not yet know or understand the command. Likewise, if the robotic life form 20 is in an injured mode 434, then it will not respond to commands to "play with me" 522 or "play dance" 538, for example. Or if the physical attribute 324 is exhausted or very exhausted, a command to "come to me" 514 may only by partially completed, for example.

The temperature sensor 125 (FIG. 6) measures the ambient temperature. The normal operating range may be from approximately 50° F. (10° C.) to 104° F. (40° C.), for example. Depending on the lifeform this range may vary considerably. If the temperature is near or above an upper temperature, an over heat 550 input mode (FIG. 10E) is triggered negatively, affecting the physical 324 and health 328 attributes as well as the temperament attribute 306 resulting in the decrementing of the associated indexes over time, and triggering a panting mode 552. In the panting mode, the robotic life form's mouth 30 is opened by the mouth servo actuator 86 and a panting sound is produced by the speaker 130. If the temperature is near or below a lower temperature, a too cold 554 input mode is triggered negatively "affecting' the physical 324 and health 328 attributes and decrementing the associated indexes. A sneeze/shake mode 556 is triggered resulting in a sneezing action by moving the head 88 and neck 89 servo actuators and producing a "sneezing" sound from the speaker 130 while opening the mouth 30. Shaking is accomplished by rapidly oscillating one or more of the servo actuators 86, 88, 89, 98, 100, 108, 110, 112, 116, 118 and/or 120, for example, and producing a "chattering" sound from the speaker 130.

The camera 124 located in the nose 26 detects light levels and motion. If a light during day time 560 input mode (FIG. 10G) is triggered by light being detected by the camera 124 above a predetermined threshold, during a day period, the emotion attribute 330 is positively affected and the associated index is incremented periodically. A day period may be from 8 a.m. to 10 p.m., for example, with a corresponding night period from 10 p.m. until 8 a.m. If the ambient light drops below a predetermined threshold during the day period, a dark at day time 562 input mode is triggered negatively affecting the emotion attribute 330 and associated index resulting in a rest mode 564 being triggered. In the rest mode 564, the robotic life form 20 may lay down, lay its head 22 down and/or close its eyes 28 for example. The dark at day time 562 input mode may also negatively affect active 304 and mood 322 attributes.

If the ambient light detected by the camera 124 is above a predetermined threshold at night, a light at night time 566 input mode may be triggered negatively affecting the emotion attribute 330 as well as the mood 322 and temperament 306 attributes, for example. An uneasy mode 568 may be triggered in which the robotic life form 20 may exhibit disorientation, agitation and/or unresponsive behavior, for example.

If the ambient light detected by the camera 124 is below a predetermined level at night, a dark night time 570 input mode may be triggered positively affecting the emotion attribute 330, negatively affecting the active attribute 304 and triggering a sleep mode 572. In the sleep mode 572, the robotic life form 20 may twitch, move one or more legs 38 and 40, its head 22, neck 32 and/or tail 36, and may roll over or change sleeping positions, for example. The light level threshold may vary according to the time of day. For example, the threshold may cyclically change from a low value corresponding to the darkest time of night around 3 a.m., increasing to a high value corresponding to the brightest time of day around 1 p.m., then decreasing to the low value again.

If the camera 124 detects an object moving a moving object 574 input mode may be triggered, triggering a head follow mode 576 in which the head 88 and neck 89 actuators are actuated to track or follow the moving object.

The nose IR sensors 122 detect the presence of an object such as food in front of the robotic life form 20, as well as other obstacles and edges. If the IR sensors 122 detect an object in front of the robotic life form 20, which does not have an RFID tag recognized by the RFID reader 126, a front obstacle 578 input mode may be triggered resulting in the triggering of a backward/turn mode 580 (FIG. 10H). In the backward/turn mode 580 the robotic life form 20 may randomly turn to the left or right, walk backward and then turn left or right to avoid the detected object.

If the IR sensors 122 detect an edge such as the edge of a table or the edge of a stair, for example, a cliff detection 582 input mode may be triggered resulting in the triggering of a backward walk mode 584. In the backward walk mode 584, the robotic life form 20 may stop and back away from the detected edge and then turn left or right to avoid the edge.

A real time clock 600 begins running from the initial power-up of the robotic life form 20 and continues to run in the background providing time intervals for internal clocks and triggers, such as the light at day time input mode 560. Additionally, real-time clock 600 triggers life stage changes each three robot years 602, which triggers an age mode 604 (FIG. 10I). The age mode 604 may include life stages such as newborn, juvenile, mature and senior, for example. In the first life stage the robotic life form 20 first opens its eyes 28 and begins to adapt to its environment through its touch sensors 404, microphones 128, IR sensors 122, camera 128, G-sensor 422 and temperature sensor 125, as well as its born-in attributes 300. During the first stage the robotic life form 20 begins to interact with its environment, exhibiting basic behaviors such as standing, walking, hunger and curiosity, for example. The robotic life form 20 may take naps during the day during the first stage.

In the second stage, the robotic life form 20 may exhibit more curiosity, an interest and ability to learn commands, become more playful and exhibit somewhat unpredictable behavior and temperament. In the third stage, the robotic life form 20 may exhibit continued learning and training through interactions. A unique and recognizable personality, individual character and behavior may develop as well as a full range of body movements and social behaviors.

In the fourth stage, the robotic life form 20 may exhibit signs of growing older, such as not being as active, slower or less coordinated movements, a tendency to become ill more readily, an increased sensitivity to temperature variations and requiring more sleep or naps for example. Throughout its life stages, the robotic life form's "voice" may change as well as its "hearing" and "sight."

At regular intervals, based on the real time clock 600, a wakeup input mode 606 is triggered which triggers a wakeup mode 608 to awaken the robotic life form 20 each morning at a specified time or at various times based on physical 324, health 328 and mood 322 attributes.

A battery voltage sensor 610 monitors a battery voltage level. If the battery voltage drops below a predetermined level, a low voltage 612 input mode is triggered which triggers a shut down mode 614 to shut down the robotic life form 20. As long as the voltage level is below a predetermined level, the robotic life form 20 will remain in a shutdown condition and cannot be turned back on.

Figure 12:
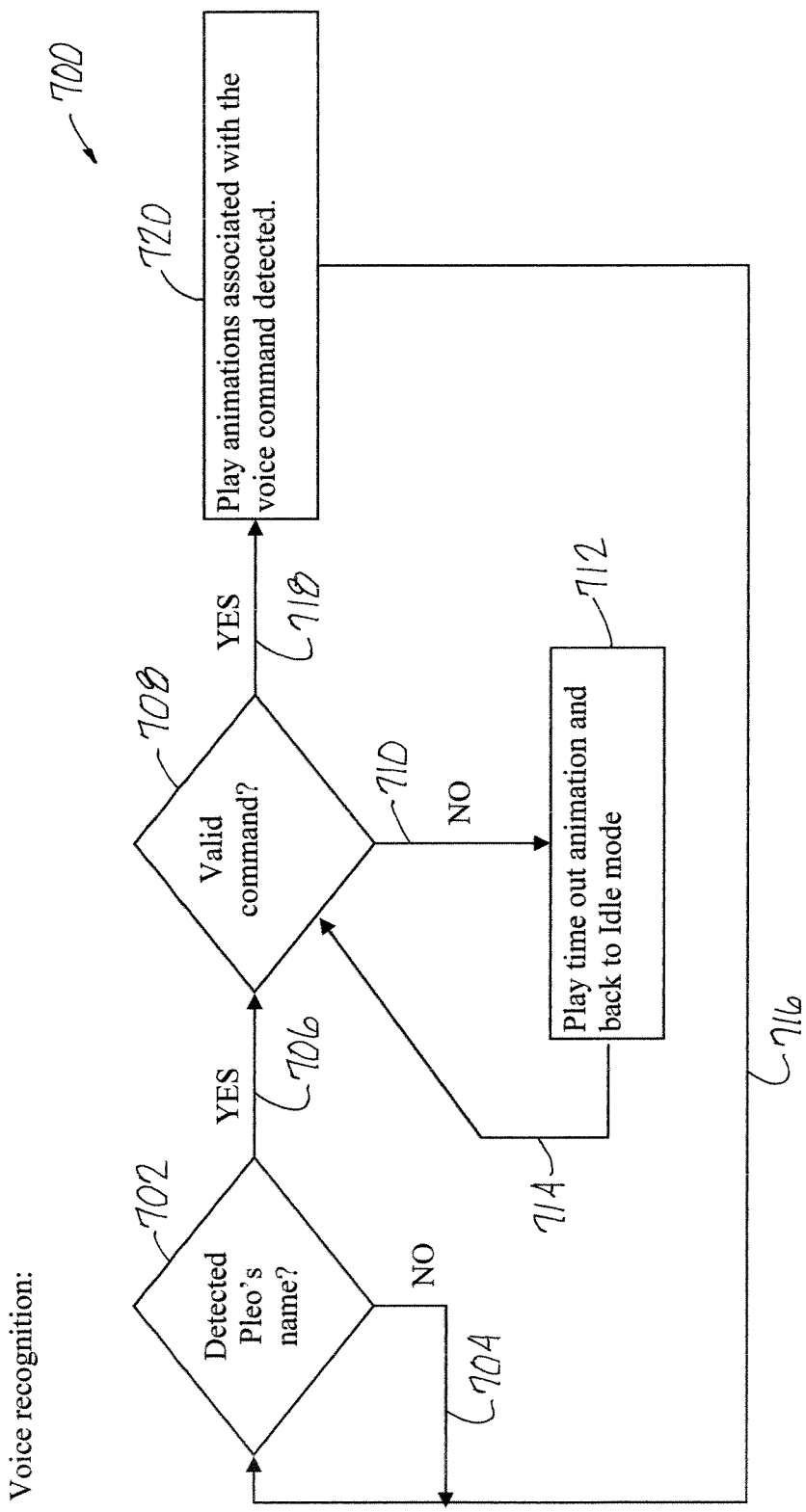
FIG. 12 is a voice recognition block diagram.
Figure 13:
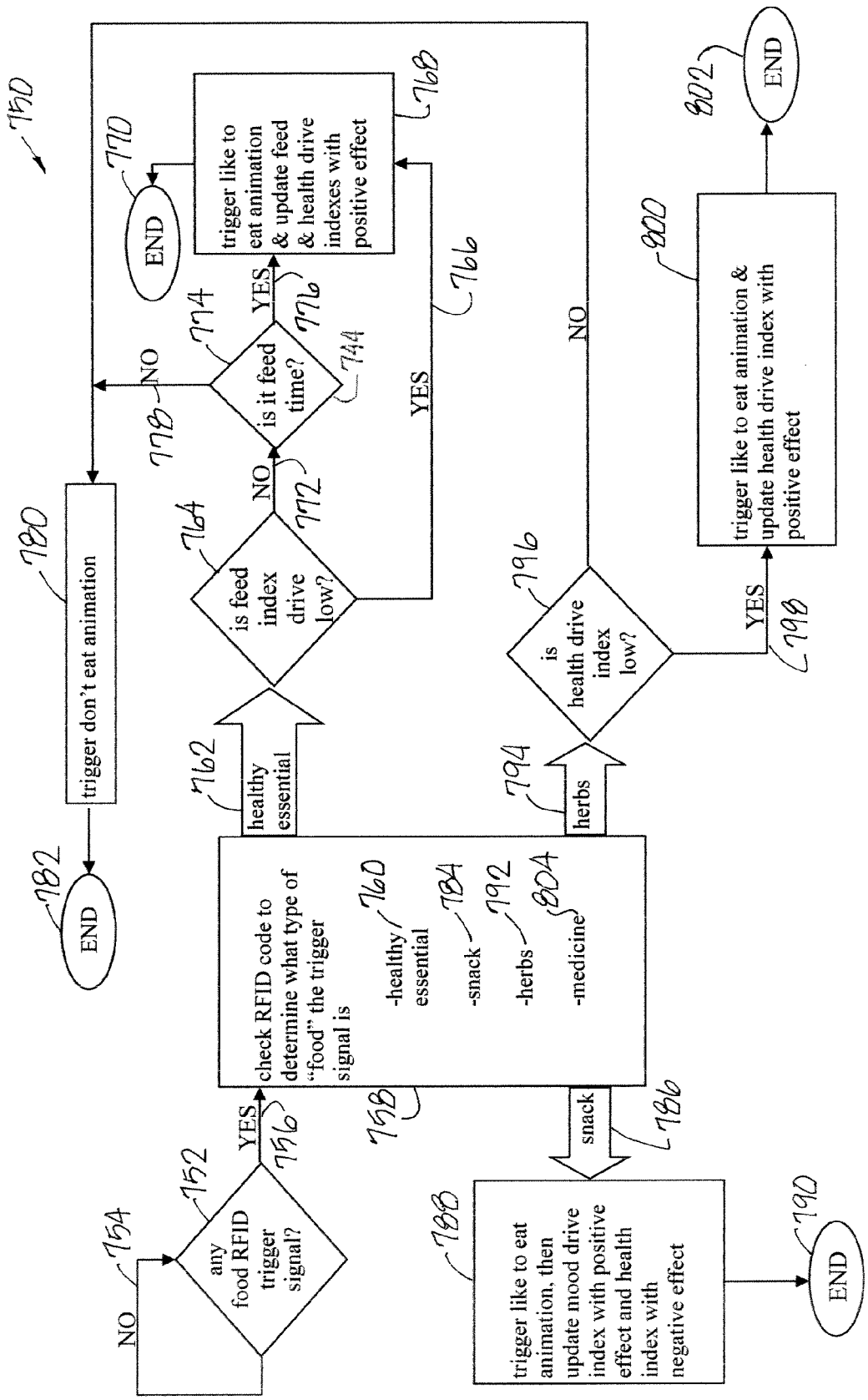
FIG. 13 is an example of a food RFID trigger flow chart.
Figure 14:
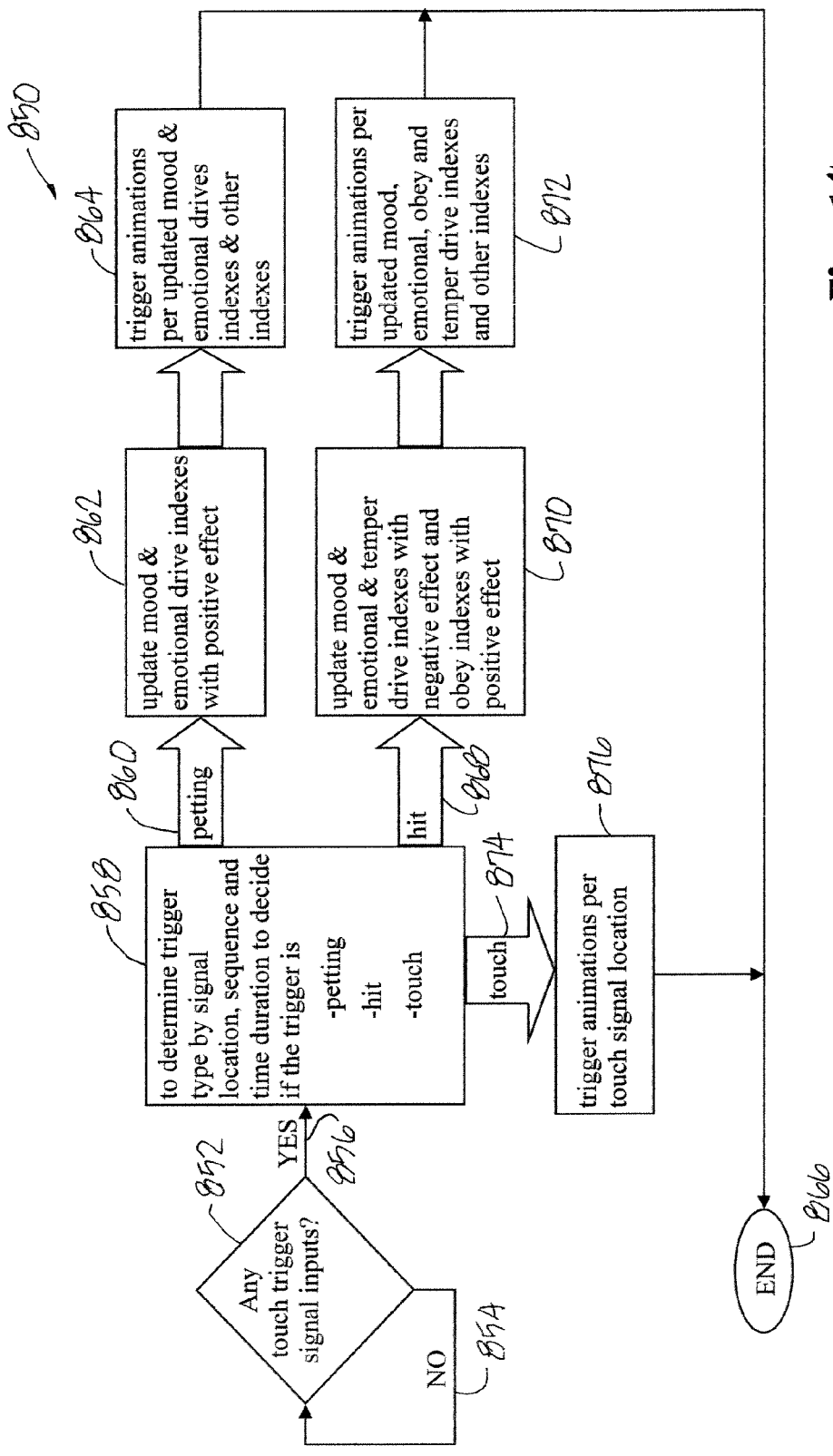
FIG. 14 is a touch trigger flow chart.

Referring to FIGS. 4, 6 and 12, the microprocessor control unit 206 includes input ports 620 which receives inputs from the voice recognition module 129 which is coupled to the microphones 128; the G-sensor 422; the touch sensor processor 43 coupled to the touch sensors 41; the IR module 121 coupled to the IR transmitters/receivers 122; the camera module 128 coupled to the camera 124; a logic module 622; the temperature sensor/module 125; the RFID reader 126 and processor 624; and a position check logic 626. Based on the external inputs 400 received via the input ports 620, the drive indexes 332 are updated 628 based on the born-in attributes 300, after-born attributes 320 and the various input modes 402 triggered. The animation drive indexes 336 are selected 630 and prioritized and the animation groups are selected 328 from the library files 632. The selected animations are sent to the output ports 634, which are output to a motor controller MCU 636, and the audio module 131 coupled to the speaker 130. The motor drives 636 provide specific control information to the selected servo actuators 638 based on the selected animations which are read by a position encoder 640 associated with each servo actuator, sent to the position check logic 626 and fed back to the input port 620 of the MCU 206. This position information is used by the drive logic to determine the current configuration of the robotic life form 20 and plan the next movement.

Referring to FIGS. 4, 6 and 11, an example logic flow chart for sensor input processing is generally indicated by reference numeral 650. Sensor inputs are received by the input ports 620 of the MCU 206. If a sound input 652 is received, the MCU 206 determines the stationary/quiet state 654 of the robotic life form 20. If the state is stationary and/or quiet 656, then the sound level is determined 658. If the sound level is high 660, then a frightened animation is executed 662 and the emotion attribute 330 is negatively affected. If the noise level is not loud 664, a sound detected animation 666 is executed by the MCU 206. If the state is not stationary and/or quiet 668, then the MCU 206 determines if the sound received is a sonic code 670. If a sonic code is detected 672, then the MCU 206 executes animations associated with the sonic code received 674. If a sonic code is not received 676, then processing terminates.

If the mouth IR sensor 122 is activated, then the MCU 206 determines if the system is in a play game mode such as tug of war 678. If the tug of war input mode 492 is triggered 680, then the play game mode 494 is triggered. If not in a play game mode 682, the MCU 206 checks for an RFID processor 624 input 684. If an object RFID tag 127 is detected 686, then the associated animation is executed 688 by the MCU 206. If an object RFID tag 127 is not detected 690, then an associated food eating animation is executed 692 by the MCU 206.

If a foot sensor 694 is activated, then an associated ground animation such as walking or dancing 696 is executed by the MCU 206. The foot sensors may be switches 72 and 74, or may be IR sensors to determine distance from an object or surface, for example.

If the G-sensor 422 input is received by the input ports 620 of the MCU 206, the associated motion animations 698 are executed by the MCU 206.

Referring to FIG. 12, an example logic flow chart for a voice recognition module is generally indicated by reference numeral 700. The microphones 128 located on each side of the robotic life form's head 22 receive sounds which are provided to the voice recognition module 129 (FIG. 6). The voice recognition module 129 analyzes each input from the microphones 128 for specific voice patterns such as the robotic life form's name 702 that is learned and stored. If the analyzed sound pattern does not match the name voice pattern 704, processing returns to the start to analyze the next sound pattern. If the analyzed sound pattern matches the voice pattern for the robotic life form's name 706, then the next sound pattern is analyzed 708. If the next sound pattern is not a valid command 710, then a time out animation is executed 712 and processing returns 714 to receive another sound pattern 708. If the next sound pattern is not a valid command 710, and the time out animation has expired 712, the processing returns 716 to the beginning 702. If a valid command 708 is recognized 718, then the associated animation is selected and executed 720, and processing returns to the beginning.

Referring to FIGS. 4, 6, 8, 10 and 13, a flow chart for a food processing module is generally indicated by reference numeral 750. The RFID reader 126 and processor 624 passively wait for a food RFID trigger signal 752. As long as a food RFID trigger signal is not detected 754, the food processing module 750 remains in an idle state 752. If a food RFID trigger signal is detected 756, the RFD code is checked to determine the type of food detected 758. If a healthy essential food RFID tag 760 is detected 762 then the feed attribute 326 index value is checked 764. If the feed attribute 326 index is low 766, for example, between 1 and 3 which is a priority A, then the eat animation is triggered 768 where the hungry input mode 464 is triggered, triggering the want to eat mode 466. With the healthy food RFID tag 760 detected by the RFID reader 126 and processor 624, the want to eat mode 466 triggers the healthy food 468 input mode. Both the feed attribute 326 and physical attribute 324 indexes are incremented 768 and the process is terminated 770.

If the feed index is not low 772, the feed attribute 326 index is checked to determine if it is feed time 774, index value 4. If it is feed time 776, then the eat animation 768 is triggered as described above, and the process terminates 770. If it is not feed time 778, the healthy food, not feed time and not hungry input mode 470 is triggered, triggering the refuse to eat mode 472 and the don't eat animation 780. Next the process is terminated.

If the feed index is not low 772, the feed attribute 326 index is checked to determine if it is feed time 774, index valve 4. If it is feed time 776, then the eat animation 768 is triggered as described above, and the process terminates 770. If it is not feed time 778, the healthy food, not feed time and not hungry input mode 470 is triggered, triggering the refuse to eat mode 472 and the don't eat animation 780. Next the process is terminated 782.

If the type of food detected 758 is a snack RFID tag 784, the snack decision path 786 is selected. The eat animation 788 is triggered where the IR not blocked snack junk food input mode 474 is triggered, triggering the want to eat mode 466, and the IR blocked snack junk food 480 input mode is triggered. The feed attribute 326 index is increment while the healthy attribute 320 index is decremented. Next, the food processing module process terminates 790.

If an herbs minority RFID tag 792 is detected 758, then the herbs processing path 794 is selected. Next the health attribute 328 index is read 796. If the health attribute 328 index is low 798, having an index value from 1 to 4 for example, then the eat animation 800 is executed where the 112 not blocked herbs/minerals input mode 486 is triggered, resulting initially in the refuse to eat mode 488 being triggered. Because the health attribute 328 index is low, if the herbs RFID tag 792 is offered blocking the IR sensors 122, the herbs/minerals 488 input mode is triggered incrementing the healthy attribute 328 index. Next the food processing module is terminated 802. If the health attribute 328 index is not low 804, the don't eat animation 780 is triggered and processing is terminated 782.

Referring to FIGS. 4, 6, 8, 10 and 14, a touch trigger flow chart is generally indicated by reference numeral 850. The touch processor 43 waits for an input 852 from any of the touch pads 41. If no inputs are received 854, the process 850 is idle. If a touch input is received 856, the processor 43 determines the trigger type by signal location, sequence and time duration to determine if the trigger is petting, a hit or a touch 858. If the trigger is petting 860, the touch sensor 404 is determined to trigger the associated input mode 402. For example, if the petting is determined to be along the robotic life form's back 50, the pet along its back input mode 406 is triggered and the mood and emotional drive indexes are positively affected 862. Associated animations are triggered 864, and processing terminates 866.

If the trigger is a hit 868, the hit anywhere input mode 418 is triggered negatively affecting the mood 322 and temperament 306 attributes, with the obey attribute 308 being negatively affected 870. Associated animations are typical 872 and processing terminates 866.

If the trigger is a touch 874, the associated animations corresponding to the touch location 876. The processing terminates 866.

The robotic life form 20 of the present invention is an autonomous creature with a complex software architecture that enables the robotic life form 20 to learn and understand verbal commands, express moods and emotions, react to various kinds of food, know time—day and night, sense hot and cold, may become sick, has skin sensation, has a sense of orientation and motion, and responds to its environment. The robotic life form 20 can feel and convey emotions, is aware of itself and interacts with its environment, and learns and evolves over time. Although the robotic life form 20 in the preferred embodiment is depicted as a Camarasaurus, it should not be limited thereto. The robotic life form 20 may embody many different life forms, some past or present, some entirely new.

The robotic life form 20 should be handled with care as with any living creature. The touch sensors 41 covering the robotic life form's body detect various touches which may affect the behavior of the robotic life form 20.

The robotic life form 20 includes a power source in the form of a rechargeable battery to power the MCU 106, circuitry and servo actuators. The robotic life form 20 also includes a mini USB port and micro SD memory card for software updates and communication with the MCU 106, and a time sync to adjust its internal time to the present time.

When the robotic life form 20 is powered-on for the first time, it may take some time to wakeup and respond to its environment. As a "newborn" robotic life form 20, it may sleep longer hours and be unwilling to play or interact during sleeping hours. This sleeping behavior may extend throughout its newborn and senior stages. In the first few days of "life," the robotic life form 20 may open its eyes, blink, and look around at its new environment, stretch and let out a cry, and cry when it is hungry. Toward the end of its newborn stage, the robotic life form 20 may take its first shaky and tentative baby steps, start to explore its environment, take shorter naps and exhibit a wider range of moods and emotions in response to interaction with its environment and owner.

Once the robotic life form 20 exhibits juvenile behavior, it may be ready to learn. The first thing the robotic life form 20 should learn is its name. To learn its name, an ID card with an RFID tag may be placed under the robotic life form's chin 31 to be recognized by the RFID reader 126. Once recognized, the robotic life form 20 may display an acknowledgement behavior such as wagging its tail 36 and opening its mouth 30. When the ID card is placed in the robotic life form's mouth 30 it may close its mouth 30 and exhibit acceptance behavior, making happy or pleasant sounds, swinging its head back and forth then waiting to hear and learn the name the owner has chosen for it. If the robotic life form's chosen name is spoken loudly and clearly, the robotic life form 20 may wag its tail, swing its head back and forth, and then release the ID card to indicate that it has learned its name. The robotic life form 20 may be renamed by repeating this procedure.

The robotic life form 20 may be trained to listen to and memorize verbal commands. One or more learning RFID tags may be used to initiate training the robotic life form 20 to learn verbal commands. A general purpose learning RFID tag may be used to initiate learning verbal commands or specific RFID tags may be used for learning specific commands. For example, to learn the "come to" command 514 and the "play with me" command 522, a single RFID tag may be used which is recognized by the RFID reader 126 and processor 624 to trigger the learning process. Alternatively, a unique RFID tag may be used to learn each command. By using a unique RFID tag to learn a specific command, the robotic life form 20 may learn the preprogrammed command in any language. By invoking the learning process for a specific command, and learning that sound pattern for the command being learned, the verbal command may be customized and controlled by the owner. Once the command has been learned by the robotic life form 20, it may wag its tail 36, act excited by swinging its head 22 from side to side and release the learning RFID tag.

For the robotic life form 20 to perform a verbal command, it may be necessary to first get its attention by it hearing its name. When the robotic life form 20 hears its name, it may stand still and look up in the direction of the sound. Depending on the index values and obey attribute 308 index value, the robotic life form 20 may respond to the verbal command by performing the verbal command.

The robotic life form 20 uses its G-sensor 422 input in combination with its touch sensors 41 and foot switches 72 and 74 to determine orientation and motion. When one or more of the foot switches 72 and/or 74 are engaged, the MCU 206 determines that the robotic life form 20 is in contact with a surface. Further, as the robotic life form 20 moves or walks, the feedback received from the position encoder 670 and position check 626 logic and the foot switches 72 and 74 are used by the MCU 206 to determine the position and direction of movement of the robotic life form 20. The position sensor 428 function of the G-sensor 422 provides orientation information to the MCU 206, which is used with touch sensor 41 input to determine if the robotic life form 20 is being held with its head 22 up or its tail 36 up. Input from the tail touch sensor 62 and the position sensor 428 function of the G-sensor 422 may be used by the MCU 206 to determine that the robotic life form 20 is being held by the tail, generating an appropriate response such as a struggling movement and howl, for example.

A swinging motion may be detected by the motion sensor 424, acceleration sensor 430 and direction sensor 426 functions of the G-sensor 422. For example, a swinging motion is detected as the G-sensor 422 detects motion primarily in an X or Z plane, or some combination there of, with some Y axis variance assuming a substantially horizontal arc, positive acceleration followed by negative acceleration, then an abrupt change in direction at a peak Y axis value, for example. The swinging motion is likely repeated for a period of time resulting in the mood 322 and emotion 330 attribute indexes being incremented. The MCU 206 may generate a response such as a wagging tail, a happy sound and holding the robotic life form's head 22 up.

Similarly, a drop event may be detected by the motion sensor 424, acceleration sensor 430 and direction sensor 426 of the G-sensor 422. When the robotic life form 20 is dropped, the G-sensor 422 detects motion in the Y axis, in a negative direction, and a positive acceleration, followed by an abrupt stop and input from various touch sensors 41 activated depending on the areas hitting the ground. Depending on the magnitude of the impact determined by the fall time, and the touch sensors 41 activated, may determine if the robotic life form 20 is injured, and if so how severely and to which part(s), or if it is just frightened. Dropping the robotic life form 20 may result in a negative effect on the physical 324, health 328, mood 322, emotion 330 and obedience 308 attributes. The external response by the MCU 206 may include a twitching body, a dropped head 22 and tail 36, eyes 28 half closed, and a whimpering sound, for example to indicate an injury.

It should be understood that while certain forms of this invention have been illustrated and described, it is not limited thereto except insofar as such limitations are included in the following claims.

Having thus described the invention, what is claimed as new and desired to be secured by Letters Patent is:

1. A robotic life form responsive to a changing environment sensed by the robotic life form, said robotic life form comprising:
   a robotic body simulating a young Camarasaurus articulated for motion upwardly and downwardly and from side to side and supported by front and rear legs terminating in respective feet, each of said legs having at least two joints, said body having a neck terminating in a head provided with eyes and a mouth,
   internal and external input sensors located on said robotic body and responsive to touch, sound and lighting conditions, motion, food, temperature, voice commands, time of day, and obstacles and hazards, including a head touch sensor, a plurality of touch sensors extending along a torso of said body, and a plurality of touch sensors on said feet,
   means responsive to said sensors for determining drive index levels in a plurality of animation groups comprising a mood of the robotic body corresponding to one of a plurality of drive index levels from sad to happy, a physical state of the robot corresponding to one of a plurality of drive index levels from exhausted or sleepy to energetic, a state of the robotic body determined by food drive index levels from hungry to overfed and sick, health drive index levels from sick to healthy, and emotion drive index levels of the robotic body from fearful to excited, and
   a plurality of servo actuators associated with said robotic body and responsive to dominant ones of the drive indexes selected in accordance with priority criteria associated with each of the drive index levels for causing the robotic life form to execute animations resulting therefrom and consistent with born-in attributes of gender, activeness, temperament, obedience, tone, volume and intelligence.

2. The robotic life form as claimed in claim 1, wherein a first of said actuators controls said eyes of the robot, a second of said actuators controls opening and closing of said mouth, a third of said actuators controls movement of said head, a fourth of said actuators controls movement of the neck relative to the torso, and a fifth of said actuators controls relative movement of front and rear sections of said torso to cause the torso to pivot and twist, whereby to provide life-like responses to the sensed conditions.

3. The robotic life form as claimed in claim 1, further comprising means in said robot establishing born-in attributes including gender, activeness, temperament, obedience, tone, volume and intelligence.

4. The robotic life form as claimed in claim 1, wherein said robot is a male, characterized by agility, bad temperament, stubbornness, low tone, loud volume, and low intelligence.

5. The robotic life form as claimed in claim 1, wherein said robot is a female, characterized by quietness, good temperament, obedience, high tone, quiet volume, and sharp intelligence.

6. The robotic life form as claimed in claim 1, wherein the robot is of neuter gender characterized by normal activeness, temperament, obedience, tone, volume and intelligence.

7. The robotic life form as claimed in claim 1, wherein said robotic body is provided with a sound sensor, means responsive to loud sounds for playing scared animations and updating behavior indexes, playing sound-detected animations in response to lower level sounds, or animations associated with a sonic code received.

8. The robotic life form as claimed in claim 1, wherein said input sensors include a snout infrared sensor, and a G-sensor for initiating play animations in response to the snout sensor and animations associated with directional impact and movement.

9. The robotic life form as claimed in claim 1, further including means for executing play animations in response to a detected voice command.

10. The robotic life form as claimed in claim 1, wherein said robot is provided with means responsive to a food RFID trigger signal to determine whether the food is healthy, a snack, herbs or medicine, and responding positively or negatively depending upon predetermined food drive index levels.

11. The robotic life form as claimed in claim 1, wherein said input sensors respond to petting positively and update mood and emotional drive indexes, respond to a hit negatively by updating mood, emotional and temper drive indexes with a negative effect and updating corresponding drive indexes, and respond to a touch by triggering animations corresponding to a touch signal location.

12. The robotic life form as claimed in claim 1, wherein said robotic body has a tail articulated for motion with respect to said body, and a tail up-down servo actuator and a tail side-to-side servo actuator coupling the tail to a rear of said torso in response to an output drive.

13. The robotic life form as claimed in claim 1, wherein said robotic body has male born-in attributes of agility, bad temperament, stubbornness, low tone, loud volume, and slow intelligence.

14. The robotic life form as claimed in claim 1, wherein the robotic body has neuter born-in attributes of normal activeness, temperament, obedience, tone, volume, and intelligence.

15. The robotic life form as claimed in claim 1, wherein said robotic body has female born-in attributes and is quiet, of good temperament, obedient, high tone, quiet volume and sharp intelligence.

16. The robotic life form as claimed in claim 1, wherein said mood of the robot has drive index levels from very sad to very happy, physical drive index levels from very exhausted or sleepy to very energetic, feed index levels from very hungry to overfed and sick, health index levels from very sick to very healthy, and emotion index levels from very fearful or angry to very excited, and includes animation group selection logic responsive to said index levels.

17. The robotic life form as claimed in claim 1, further comprising sensor triggers responsive to sound, a mouth IR sensor, foot IR sensors, and a G-sensor for initiating corresponding animations.

18. The robotic life form as claimed in claim 1, further including means for recognizing a name of the robotic life form and initiating play animations associated with a detected voice command.

19. The robotic life form is claimed in claim 1, wherein a food processing module is provided responsive to an RFID trigger signal for determining whether the food is healthy essential, a snack, herbs or medicine, and updating drive indexes with a corresponding positive or negative effect.

20. The robotic life form as claimed in claim 1, further including means responsive to a food RFID trigger signal for determining the type of food and updating drive indexes with corresponding positive or negative effects.

21. An autonomous personal robotic companion simulating a live creature responsive to a changing environment sensed by the robotic companion, said robotic companion comprising:
  a robotic body simulating a young Camarasaurus articulated for motion upwardly and downwardly and from side to side and supported by front and rear legs terminating in respective feet, each of said legs having at least two joints, said body having a neck terminating in a head provided with eyes and a mouth,
  said robotic body having born-in attributes including gender, activeness, temperament, obedience, tone, volume and intelligence,
  internal and external input sensors located on said robotic body and responsive to touch, sound and lighting conditions, motion, food, temperature, voice commands, time of day, and obstacles and hazards, including a head touch sensor, a plurality of touch sensors extending along a torso of said body, and a plurality of touch sensors on said feet,
  means responsive to said sensors for determining drive index levels in a plurality of animation groups comprising a mood of the robotic body corresponding to one of a plurality of drive index levels from sad to happy, a physical state of the robot corresponding to one of a plurality of drive index levels from exhausted or sleepy to energetic, a state of the robotic body determined by food drive index levels from hungry to overfed and sick, health drive index levels from sick to healthy, and emotion drive index levels of the robotic body from fearful to excited, and
  a plurality of servo actuators associated with said robotic body and responsive to dominant ones of the drive indexes selected in accordance with priority criteria associated with each of the drive index levels for causing the robotic companion to execute animations resulting therefrom and consistent with said born-in attributes of gender, activeness, temperament, obedience, tone, volume and intelligence.

22. A robotic life form responsive to a changing environment sensed by the robotic life form, said robotic life form comprising:
  a robotic body simulating a young Camarasaurus articulated for motion upwardly and downwardly and from side to side and supported by front and rear legs terminating in respective feet, each of said legs having at least two joints, said body having a neck terminating in a head provided with eyes and a mouth,
  internal and external input sensors located on said robotic body and responsive to touch, sound and lighting conditions, motion, food, temperature, voice commands, time of day, and obstacles and hazards, including a head touch sensor, a plurality of touch sensors extending along a torso of said body, and a plurality of touch sensors on said feet,
  means responsive to said sensors for determining drive index levels in a plurality of animation groups comprising a mood of the robotic body corresponding to one of a plurality of drive index levels from sad to happy, a physical state of the robot corresponding to one of a plurality of drive index levels from exhausted or sleepy to energetic, a state of the robotic body determined by food drive index levels from hungry to overfed and sick, health drive index levels from sick to healthy, and emotion drive index levels of the robotic body from fearful to excited,
  a plurality of servo actuators associated with said robotic body and responsive to dominant ones of the drive indexes selected in accordance with priority criteria associated with each of the drive index levels for causing the robotic life form to execute animations resulting therefrom and consistent with born-in attributes of gender, activeness, temperament, obedience, tone, volume and intelligence, and
  a food processing module responsive to a food RFID trigger signal for determining the type of food and updating the drive indexes with corresponding positive or negative effects.

* * * * *